(12) United States Patent
Bernstein et al.

(10) Patent No.: US 11,546,077 B2
(45) Date of Patent: Jan. 3, 2023

(54) SCALABLE, ULTRA-LOW-LATENCY PHOTONIC TENSOR PROCESSOR

(71) Applicant: Massachusetts Institute of Technology, Cambridge, MA (US)

(72) Inventors: Liane Sarah Beland Bernstein, Cambridge, MA (US); Alexander Sludds, Cambridge, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/673,268

(22) Filed: Feb. 16, 2022

(65) Prior Publication Data
US 2022/0337333 A1      Oct. 20, 2022

Related U.S. Application Data

(60) Provisional application No. 63/175,675, filed on Apr. 16, 2021.

(51) Int. Cl.
*H04J 14/02* (2006.01)
*G06N 3/067* (2006.01)
(Continued)

(52) U.S. Cl.
CPC ........ *H04J 14/0234* (2013.01); *G06N 3/0675* (2013.01); *H04B 10/541* (2013.01); *H04B 10/614* (2013.01); *H04J 14/0224* (2013.01)

(58) Field of Classification Search
None
See application file for complete search history.

(56) References Cited

U.S. PATENT DOCUMENTS

| | | | | |
|---|---|---|---|---|
| 5,095,459 A | * | 3/1992 | Ohta | G06N 3/067 708/801 |
| 5,325,388 A | * | 6/1994 | Gupta | G02F 1/01708 372/50.1 |

(Continued)

OTHER PUBLICATIONS

Abel et al., "Large Pockels effect in micro-and nanostructured barium titanate integrated on silicon." Nature Materials 18.1 (2019): 42. 33 pages.

(Continued)

*Primary Examiner* — Jai M Lee
(74) *Attorney, Agent, or Firm* — Smith Baluch LLP

(57) ABSTRACT

Deep neural networks (DNNs) have become very popular in many areas, especially classification and prediction. However, as the number of neurons in the DNN increases to solve more complex problems, the DNN becomes limited by the latency and power consumption of existing hardware. A scalable, ultra-low latency photonic tensor processor can compute DNN layer outputs in a single shot. The processor includes free-space optics that perform passive optical copying and distribution of an input vector and integrated optoelectronics that implement passive weighting and the nonlinearity. An example of this processor classified the MNIST handwritten digit dataset (with an accuracy of 94%, which is close to the 96% ground truth accuracy). The processor can be scaled to perform near-exascale computing before hitting its fundamental throughput limit, which is set by the maximum optical bandwidth before significant loss of classification accuracy (determined experimentally).

20 Claims, 19 Drawing Sheets

(51) Int. Cl.
H04B 10/61 (2013.01)
H04B 10/54 (2013.01)

(56) References Cited

U.S. PATENT DOCUMENTS

| | | | |
|---|---|---|---|
| 11,022,826 B2 | 6/2021 | Panuski et al. | |
| 11,373,089 B2* | 6/2022 | Englund | G06N 3/0675 |
| 11,373,092 B2* | 6/2022 | Piveteau | G06N 3/084 |

OTHER PUBLICATIONS

Athale et al. Optical matrix-matrix multiplier based on outer product decomposition. Applied Optics vol. 21 2089 (1982), 2 pages.
Baert et al. "20.1 a 5GS/s 7.2 ENOB time-interleaved VCO-based ADC achieving 30.5 fJ/conv-step." 2019 IEEE International Solid-State Circuits Conference-(ISSCC). IEEE, 2019, 62 pages.
Bernstein et al. "Scalable Ultralow Latency Photonic Tensor Processor." CLEO: Science and Innovations. Optica Publishing Group, 2022, 2 pages.
Bernstein et al. Freely scalable and reconfigurable optical hardware for deep learning. Sci. Rep. 11, 3144 (2021), 12 pages.
Bindra et al. "A 0.2-8 MS/s 10b flexible SAR ADC achieving 0.35-2.5 fJ/conv-step and using self-quenched dynamic bias comparator." 2019 Symposium on VLSI Circuits. IEEE, 2019, 2 pages.
Caragiulo et al. "A compact 14 GS/s 8-bit switched-capacitor DAC in 16 nm FinFET CMOS." 2020 IEEE Symposium on VLSI Circuits. IEEE, 2020, 2 pages.
Casasent et al. A. Optical linear algebra processors: noise and error-source modeling. Opt. Lett. 10, 252-254 (1985).
Chen et al. "Ultra-low capacitance and high speed germanium photodetectors on silicon." Optics Express 17.10 (2009): 7901-7906.
Chen et al. Eyeriss: An Energy-Efficient Reconfigurable Accelerator for Deep Convolutional Neural Networks. IEEE J. Solid-State Circuits 52, (2016): 4 pages.
Dias, "Incoherent optical matrix-matrix multiplier," NASA. Langley Research Center Opt. Inform. Process. for Aerospace Appl., Dec. 1, 1981, 13 pages.
Eltes et al. "A BaTiO 3-based electro-optic Pockels modulator monolithically integrated on an advanced silicon photonics platform." Journal of Lightwave Technology 37.5 (2019): 1456-1462.
Feldmann et al. All-optical spiking neurosynaptic networks with self-learning capabilities. Nature 569, 208-214 (2019).
Goi et al. Perspective on photonic nemristive neuromorphic computing. PhotoniX 1, 3 (2020), 26 pages.
Goodman et al. "Fully parallel, high-speed incoherent optical method for performing discrete Fourier transforms." Optics Letters 2.1 (1978): 1-3.
Hamerly et al. "Large-scale optical neural networks based on photoelectric multiplication." Physical Review X 9.2 (2019): 021032, 12 pages.
holoeye.com website GAEA-2 10 megapixel Phase Only LCOS-SLM (reflective) accessed https://holoeye.com/gaea-4k-phase-only-spatial-light-modulator/, Aug. 2022, 8 pages.
Joshi et al. Accurate deep neural network inference using computational phase-change memory. Nature Communications vol. 11 (2020), 13 pages.
Jouppi et al. In-datacenter performance analysis of a tensor processing unit. In Computer Architecture (ISCA), 2017 ACM/IEEE 44th Annual International Symposium on, 1-12 (IEEE, 2017).
Kim et al. "Large-scale uniform optical focus array generation with a phase spatial light modulator." Optics Letters 44.12 (2019): 3178-3181.
Krizhevsky et al. "Imagenet classification with deep convolutional neural networks." Advances in Neural Information Processing Systems 25 (2012), 9 pages.
Lin et al. All-optical machine learning using diffractive deep neural networks. Science 361, 1004-1008 (2018).
Livermore "Course materials for 6.777 J/2.372 J Design and Fabrication of Microelectromechanical Devices, Spring 2007." (2007), 16 pages.
Malitson "Interspecimen comparison of the refractive index of fused silica." JOSA 55.10 (1965): 1205-1209.
Matula "Electrical resistivity of copper, gold, palladium, and silver." Journal of Physical and Chemical Reference Data 8.4 (1979): 1147-1298.
Muller et al. Limit to the Bit-Rate Capacity of Electrical Interconnects from the Aspect Ratio of the System Architecture. J. Parallel Distrib. Comput. 41, 42-52 (1997).
Miller "Attojoule optoelectronics for low-energy information processing and communications." Journal of Lightwave Technology 35.3 (2017): 346-396.
Nguyen Introduction to MEMS Design. University of California at Berkeley course outline dated Feb. 25, 2016, accessed at ttps://inst.eecs.berkeley.edu/~ee247b/sp16/modules/Module8.MicrostructuralElements.ee247b-me218. s16.ctnguyen.pdf (2016), on Aug. 29, 2022, 21 pages.
Peng et al. "Design of high-speed phase-only spatial light modulators with two-dimensional tunable microcavity arrays." Optics Express 27.21 (2019): 30669-30680.
Rhodes et al. Acoustooptic algebraic processing architectures. Proc. IEEE 72, 820-830 (1984).
Shao et al. Simba: Scaling Deep-Learning Inference with Multi-Chip-Module-Based Architecture. in Proceedings of the 52nd Annual IEEE/ACM International Symposium on Microarchitecture 14-27 (Association for Computing Machinery, (2019).
Shen et al. "Deep learning with coherent nanophotonic circuits." Nature Photonics 11.7 (2017): 441-446.
Sze et al. "Efficient processing of deep neural networks: A tutorial and survey." Proceedings of the IEEE 105.12 (2017): 2295-2329.
Tait et al. Neuromorphic photonic networks using silicon photonic weight banks. Sci. Rep. 7, 7430 (2017), 10 pages.
Timurdogan et al., "An ultralow power athermal silicon modulator." Nature Communications 5.1 (2014): 1-11.
Wang et al., "An optical neural network using less than 1 photon per multiplication," arXiv:2104.13467v1 [physics. optics], 42 pages, Apr. 27, 2021.
Wang et al., "An optical neural network using less than 1 photon per multiplication," Nat Commun 13, 123 (Jan. 10, 2022) https://doi.org/10.1038/s41467-021-27774-8, 8 pages.
Wetzstein et al. "Inference in artificial intelligence with deep optics and photonics." Nature 588.7836 (2020): 39-47.
Wolf et al. "Transformers: State-of-the-art natural language processing." Proceedings of the 2020 Conference on Empirical Methods in Natural Language Processing: System Demonstrations. 2020, pp. 38-45.
Xia, et al. Memristive crossbar arrays for brain-inspired computing. Nat. Mater. 18, 309-323 (2019).
Xiao et al. Analog architectures for neural network acceleration based on non-volatile memory. Applied Physics Reviews 7, 031301 (2020), 35 pages.
Xu, et al. "Scaling for edge inference of deep neural networks." Nature Electronics 1.4 (2018): 216-222.
Yao et al. Fully hardware-implemented memristor convolutional neural network. Nature 577, 641-646 (2020).

* cited by examiner

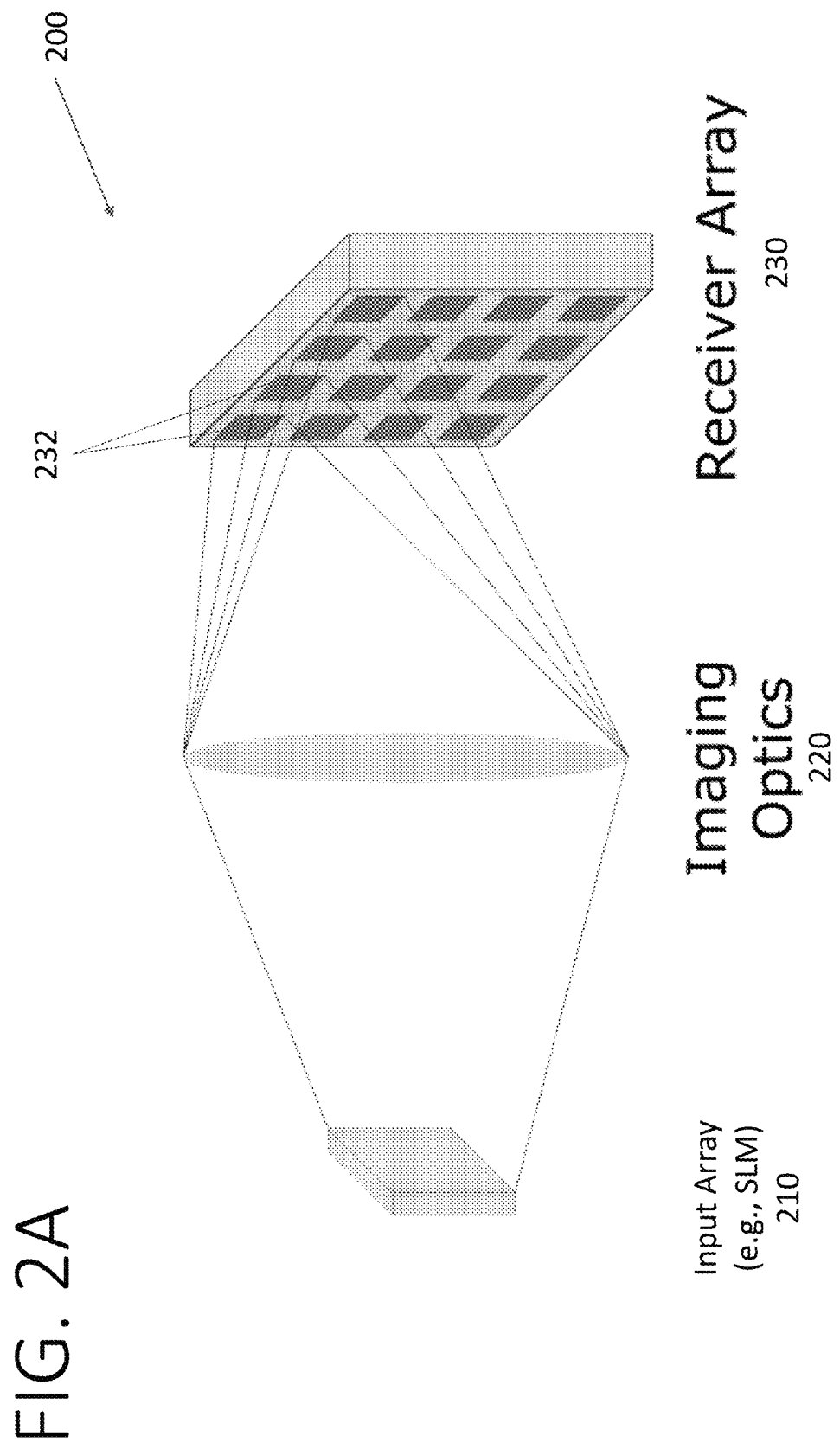

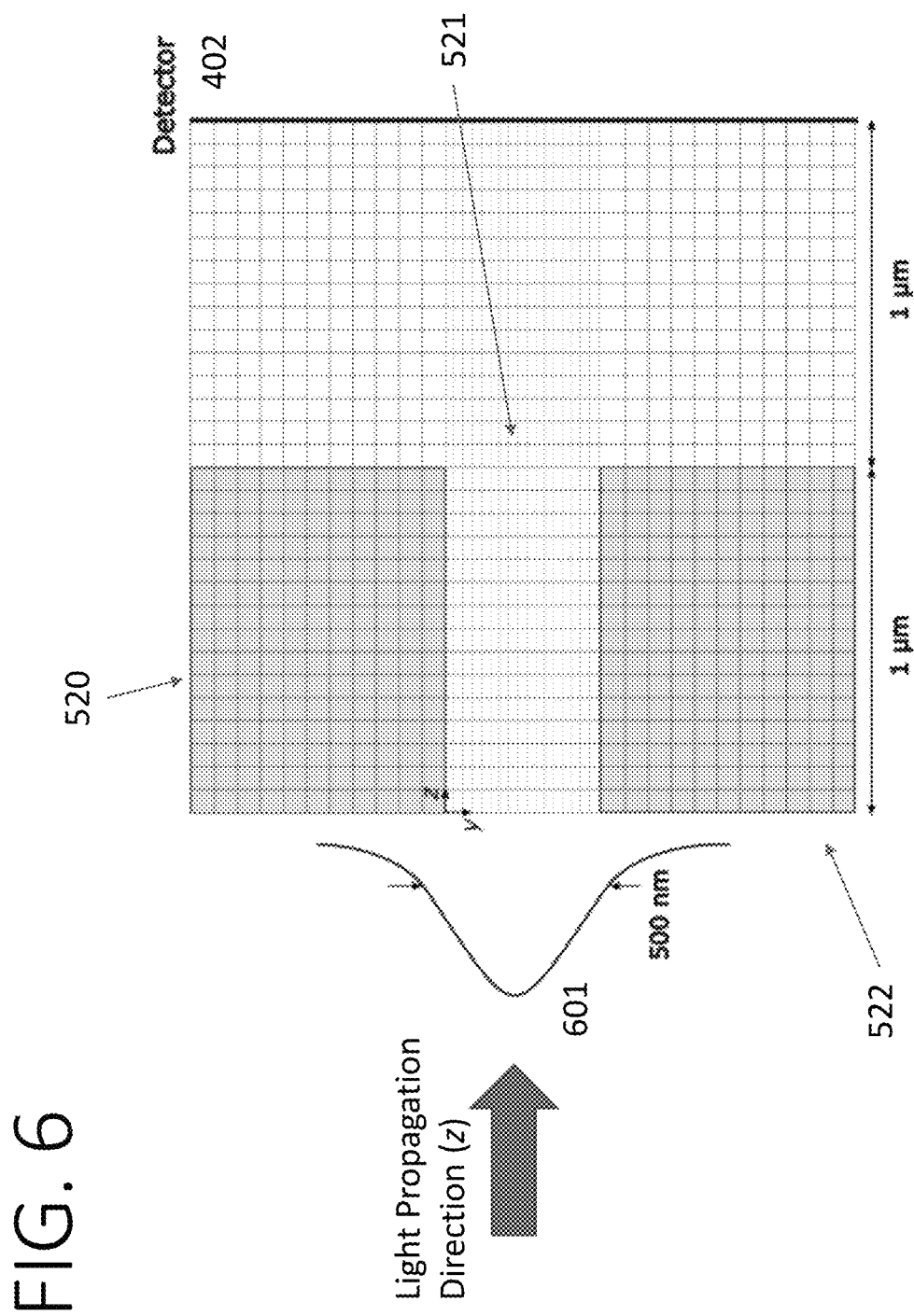

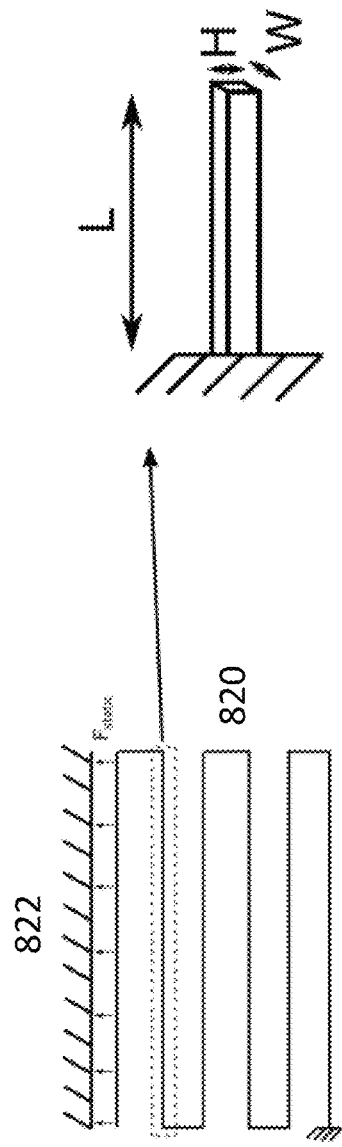
FIG. 9A
FIG. 9B
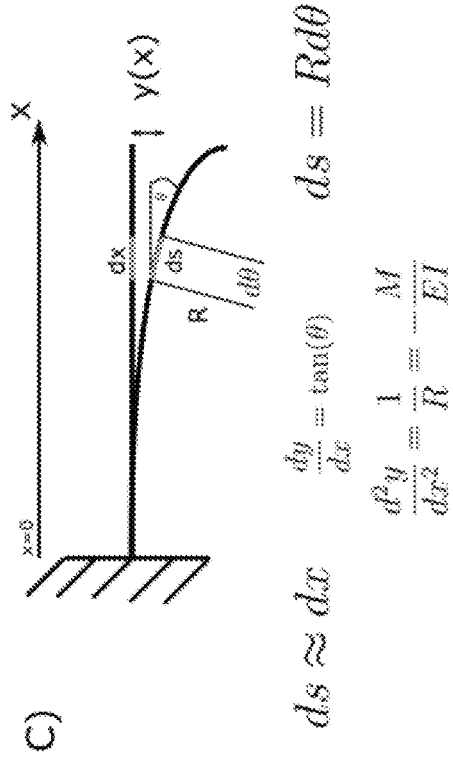
FIG. 9C

SCALABLE, ULTRA-LOW-LATENCY PHOTONIC TENSOR PROCESSOR

CROSS-REFERENCE TO RELATED APPLICATION(S)

This application claims the priority benefit, under 35 U.S.C. 119(e), of U.S. application Ser. No. 63/175,675, filed on Apr. 16, 2021, which is incorporated herein by reference in its entirety.

GOVERNMENT SUPPORT

This invention was made with Government support under Grant No. CNS1946976 awarded by the National Science Foundation (NSF). The Government has certain rights in the invention.

BACKGROUND

Deep neural networks (DNNs) are at the leading edge of classification, prediction, and translation. Furthermore, as they are being used to solve increasingly complex problems, they are growing exponentially in size. To enable these emerging algorithms, the speed and energy consumption of DNN hardware should be improved. Specifically, a typically limiting step at the core of DNN tasks is matrix-vector multiplication, where inputs encoded into a vector are multiplied by a matrix of weights.

The processor with the lowest possible latency for DNN inference tasks is one where the desired mathematical operations are executed in a single time step and without repeated memory access, since retrieving data from memory is expensive in time and energy. This high-speed computing can be realized in a so-called weight stationary dataflow. In this case, the entire weight matrix is stored on the hardware, and as long as the hardware is scalable to very large matrix sizes, the weights do not need to be updated. Input and output vectors are streamed through the weight stationary system. Google's digital electronic Tensor Processor Unit (TPU) and emerging lower-energy alternatives, such as analog electronic circuits and high-speed integrated optical matrix multipliers, employ this weight stationary approach. However, these methods are limited in scalability, i.e., the number of weights that can be stored on the hardware is on the order of 1,000×1,000; in the case of electronics, by RC time, and in optics, by constraints on control, multiplexing, programmability, component area, and insertion and waveguide loss. These schemes therefore cannot achieve optimal latencies on modern workloads because large matrices cannot "fit" onto the hardware.

Free-space optical matrix multiplication accelerators can perform matrix-vector multiplication. However, they employ fixed weighting masks and therefore cannot be reconfigured after a model update. Other free-space architectures that are reconfigurable implement weighting in the Fourier plane, and therefore cannot directly be used to run standard DNN models, which may limit their adoption.

SUMMARY

Here, we disclose a combined free-space and integrated opto-electronic DNN accelerator to scale beyond the limitations of existing weight stationary arrays. Our highly scaled array is capable of computation with energies on the order of tens of attojoules per multiply-accumulate (MAC) and a latency on the order of tens of nanoseconds for a complete million by million matrix-vector product. These energy and latency bounds are orders of magnitude better than the current state of the art. This work can enable next-generation DNNs and could also have a significant impact on other fields, such as Ising machines, complex optimization, and other machine learning tasks, where matrix-vector multiplication also dominates energy consumption and latency. Other computing schemes, including spiking neural networks, can also benefit from this architecture with a combination of analog and digital circuitry to implement biologically inspired integrate-and-fire functionalities.

This accelerator can be implemented in part as a receiver array for inference processing that includes an array of receiver blocks, each of which includes one or more arrays of photodetectors, static weighting devices (weighting devices that are static and consume no power during regular matrix multiplication but can be reconfigured), wires, modulators, an optical bus, and a broadband photodetector. Each photodetector in each array of photodetectors is configured to emit a photocurrent in response to detecting light representing a corresponding element of an input vector. Each static weighting device in each array of static weighting devices is operably coupled to a corresponding photodetector in the array of photodetectors and configured attenuate the photocurrent emitted by the corresponding photodetector by an amount proportional to a corresponding element of a weight matrix, e.g., for one layer of a neural network. Each wire in each array of wires is operably coupled to a subset of photodetectors in a corresponding array of photodetectors and configured to sum the weighted photocurrents. Each modulator in each array of modulators is operably coupled to a corresponding wire in the corresponding array of wires and configured to modulate an amplitude of a corresponding wavelength-division multiplexed (WDM) beam of light in proportion to the sum of the weight photocurrents from the corresponding wire. The optical bus is in optical communication with the corresponding array(s) of modulators and configured to guide the WDM beams of light from the array of modulators. And the broadband photodetector is in optical communication with the optical bus and configured to incoherently sum the WDM beams of light.

Each array of receiver blocks may include about 1,000 to about 1,000,000 receiver blocks. And each array of photodetectors may include about 1,000 to about 1,000,000 photodetectors.

The static weighting devices in each array of static weighting devices can be configured to attenuate the photocurrents without consuming electrical power. The static weighting devices may include nanoelectromechanical systems (NEMS) slot waveguides configured to attenuate the light representing the elements of the input vector. Alternatively, the static weighting devices can include a liquid crystal spatial light modulator (SLM) configured to attenuate the light representing the elements of the input vector. Or the static weighting devices may include memristive current dividers to attenuate the photocurrents. Other suitable static weighting devices include plasmonic slot waveguide modulators and static weighting devices with optical phase change material (PCM).

The receiver array can form part of a photonic tensor processor that also includes an input source, such as an SLM, light-source array, plasmonic modulator array, or display, configured to generate spatially modulated light with an amplitude modulation representing the input vector. Free-space optics (e.g., a phase mask) in optical communication with the receiver array and the input array fan out copies of the spatially modulated light to each receiver block in the receiver array (e.g., a two-dimensional receiver array).

A photonic tensor processor can perform inference processing as follows. Each photodetector in an array of photodetectors converts light representing a corresponding element of an input vector into a photocurrent. Static weighting devices attenuate the photocurrents by amounts proportional to respective elements of a weight matrix. The photocurrents from the array of photodetectors are summed and used to modulate an amplitude of a wavelength-division multiplexed (WDM) beam of light, which is detected for further processing. The WDM beam of light can be a first WDM beam of light, in which case the first WDM beam of light is incoherently summed with a second WDM beam of light at or by a broadband photodetector. If desired, a subsequent input vector can be generated based on the (summed) WDM beam(s) of light.

The photocurrent can be attenuated by passing the light through a slot before a corresponding photodetector, where the slot's width is selected to attenuate the light by the amount proportional to the corresponding element of the weight matrix. Alternatively, the photocurrent can be attenuated by varying a polarization of the light before the corresponding photodetector and passing the light through a polarizer before the corresponding photodetector. The corresponding photodetector detects the light transmitted through the slot or polarizer. Or the photocurrent can be attenuated by dividing the photocurrent with a memristive current divider coupled to the corresponding photodetector.

The light representing the elements of the input vector can be fanned out to the photodetectors in the array of photodetectors, e.g., by fanning out the light to a two-dimensional (spot) array.

A relatively small-scale experiment (~1,000-element-long input vector) demonstrates low loss of classification accuracy with analog optical encoding of the inputs, optical copying (fan-out), and analog optical weighting. The classification accuracy versus source bandwidth of this experimental system reveals a potential system throughput of ~200 petaMACs/s even with a reduced number of processing elements.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A illustrates a photonic tensor processor with an input array (e.g., a spatial-light modulator (SLM)) that recasts an analog input vector of length M into a 2D block of size $\sqrt{M}$ by $\sqrt{M}$ and imaging optics that replicate and image this 2D amplitude-modulated signal onto K distinct receiver blocks, or blocks for short, in a receiver array. Each block in the receiver array contains M weighting devices and computes the value of one output activation.

Figures 2B, 2C:
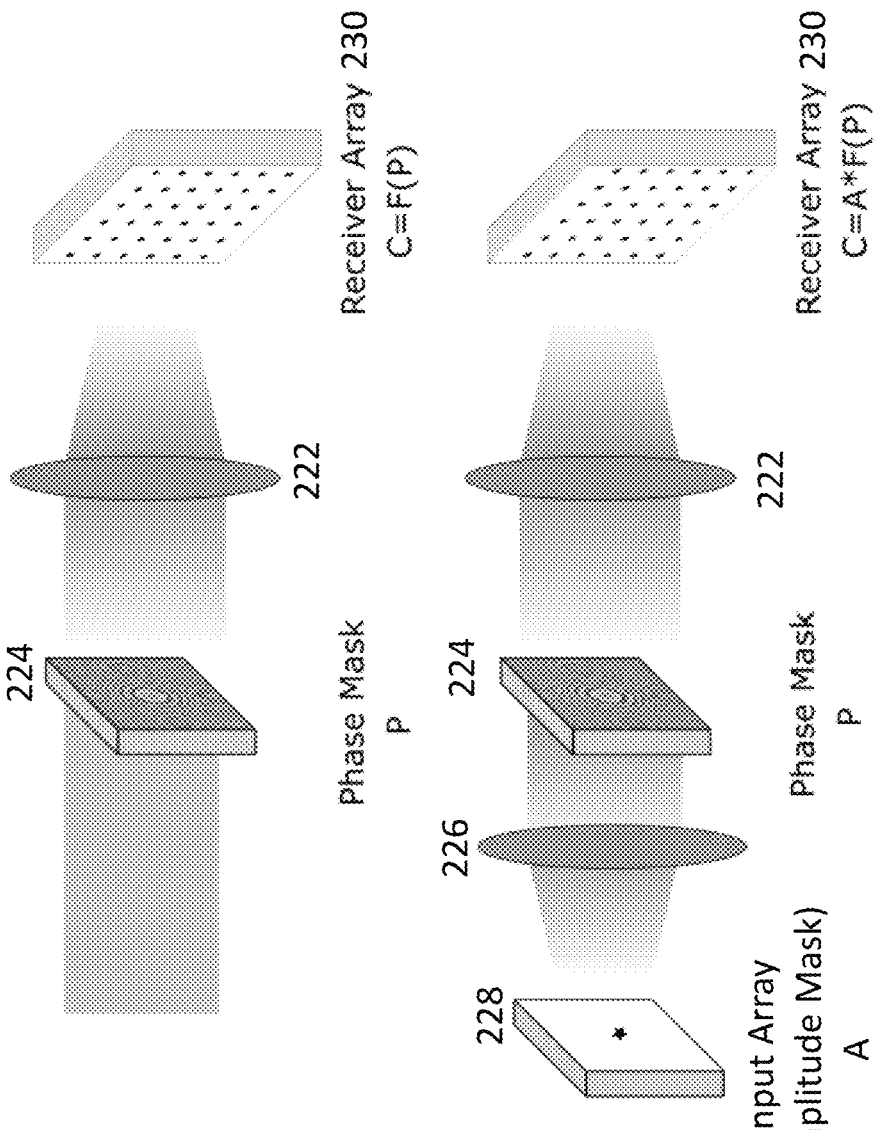

FIG. 2B illustrates fan-out (spot array generation from a collimated input beam) in the photonic tensor processor of FIG. 2A using a static phase mask.

FIG. 2C illustrates the fan-out scheme of FIG. 2B with amplitude control for the input vector.

Figure 2D:
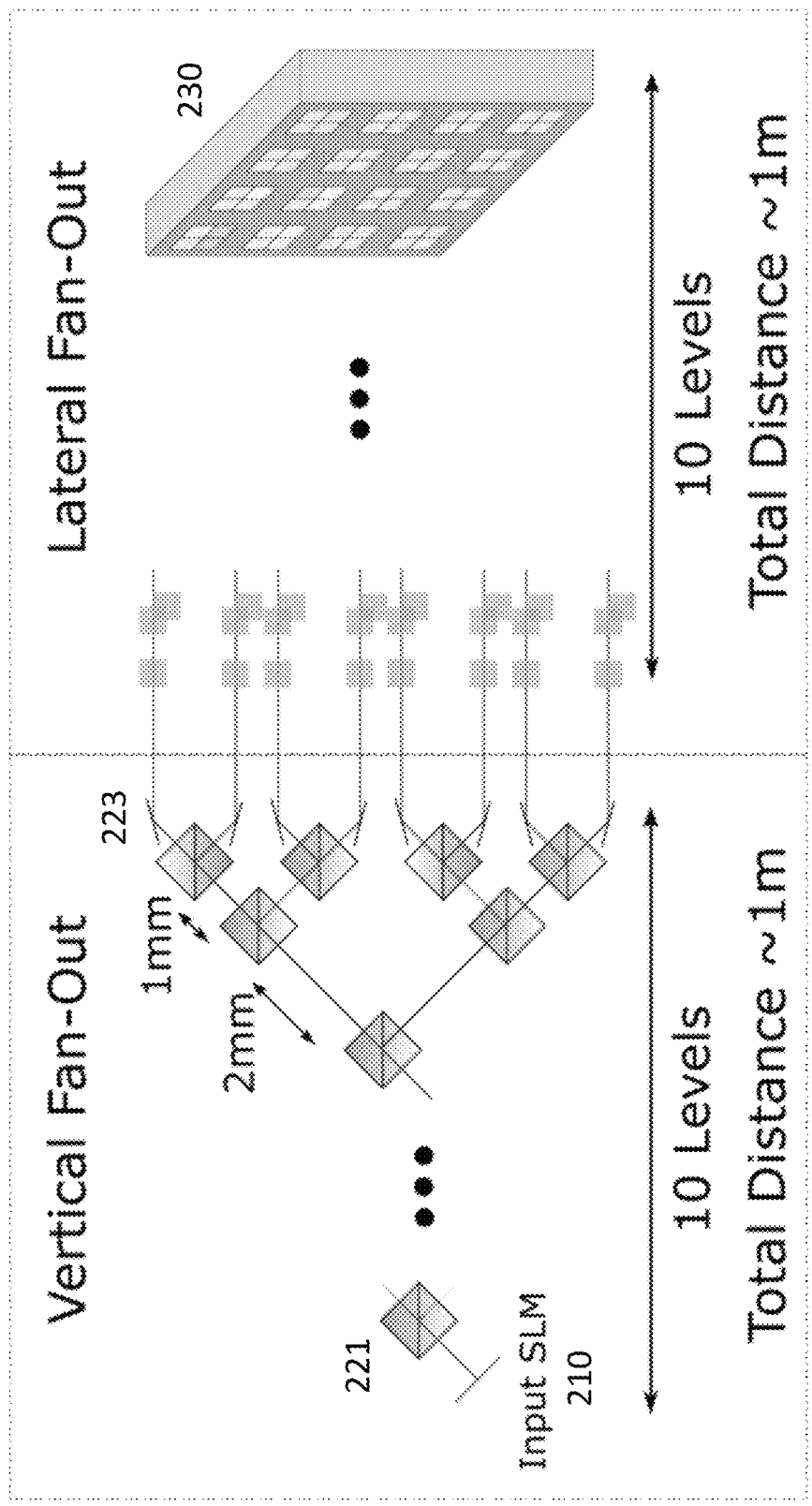

FIG. 2D illustrates another possible fan-out scheme for the photonic tensor processor of FIG. 2A with a tree of beam splitters to replicate the inputs.

Figure 2E:
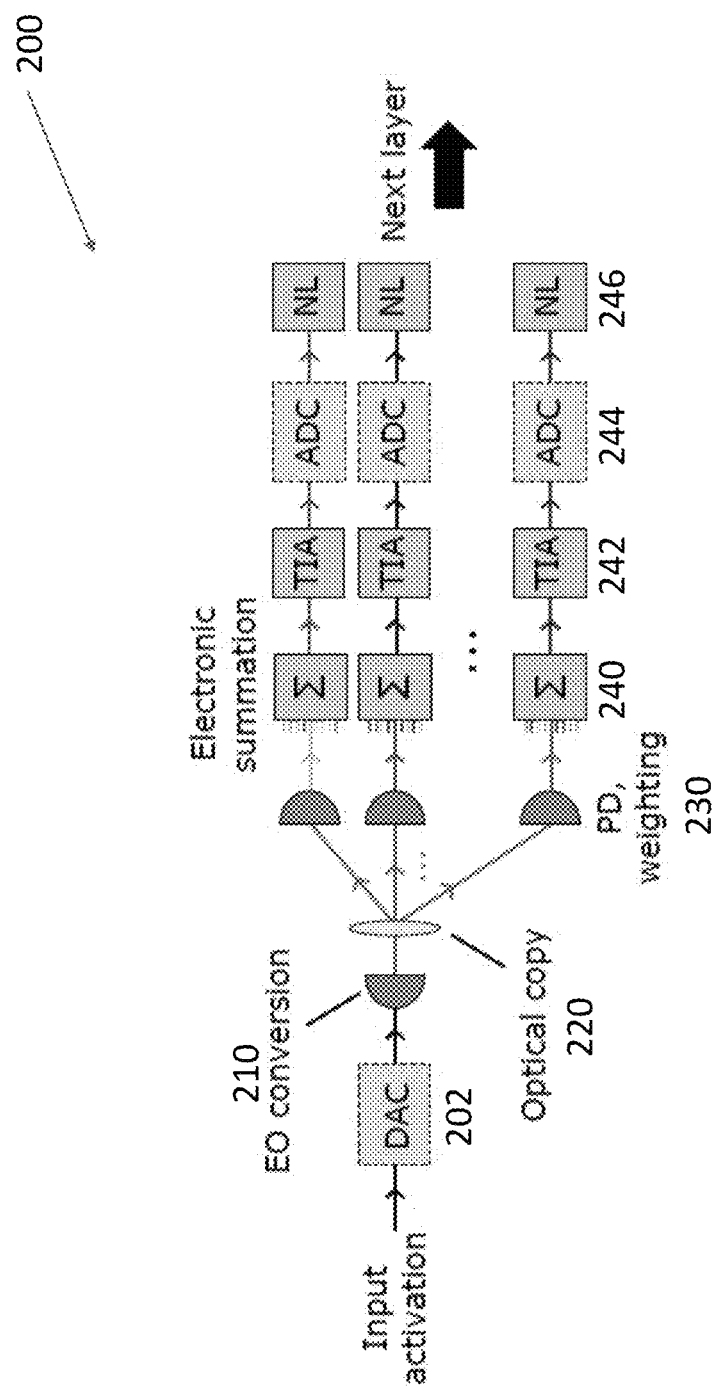

FIG. 2E illustrates the path of one input activation through our accelerator.

Figure 3:
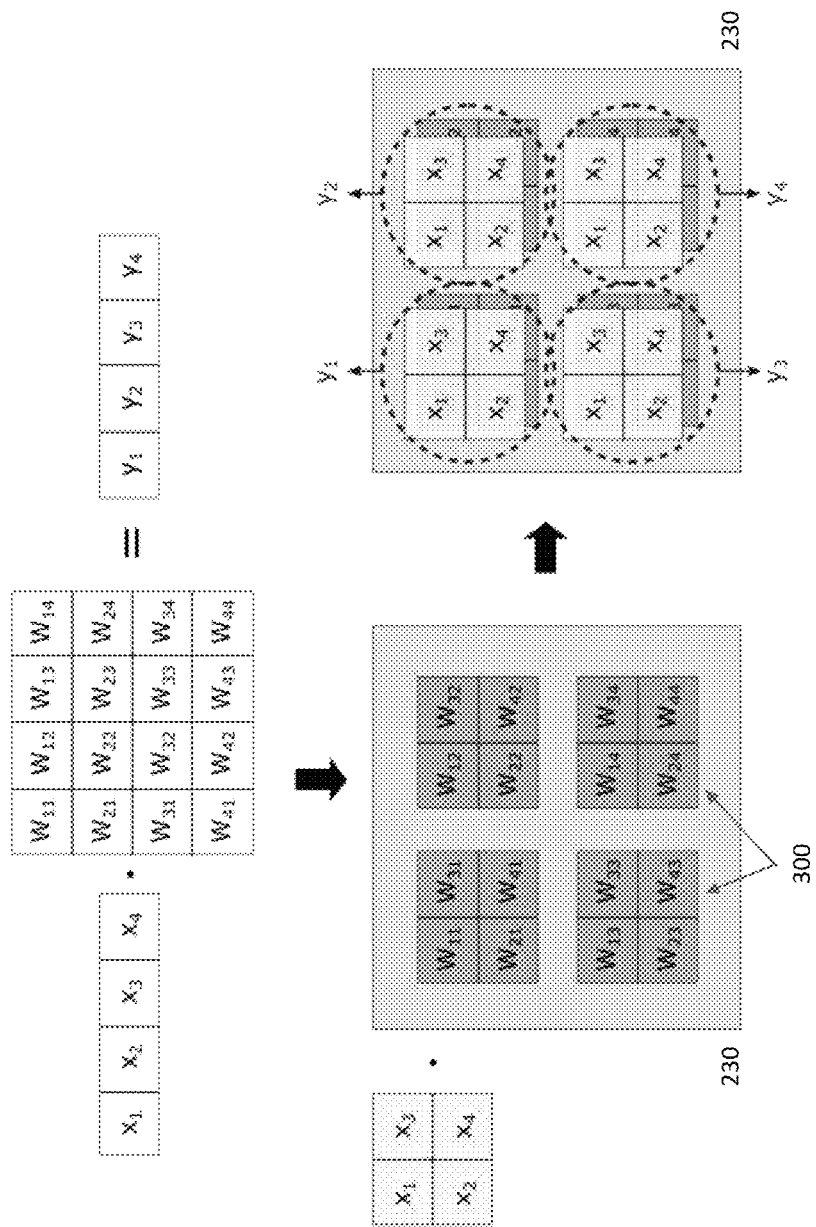

FIG. 3 illustrates matrix-vector multiplication using the optical processor architecture of FIG. 2A, where a vector of input activations (x) is optically replicated over columns of a weight matrix (W) that has been recast into blocks. The weights are encoded into static weighting devices to reduce energy consumption.

Figure 4:
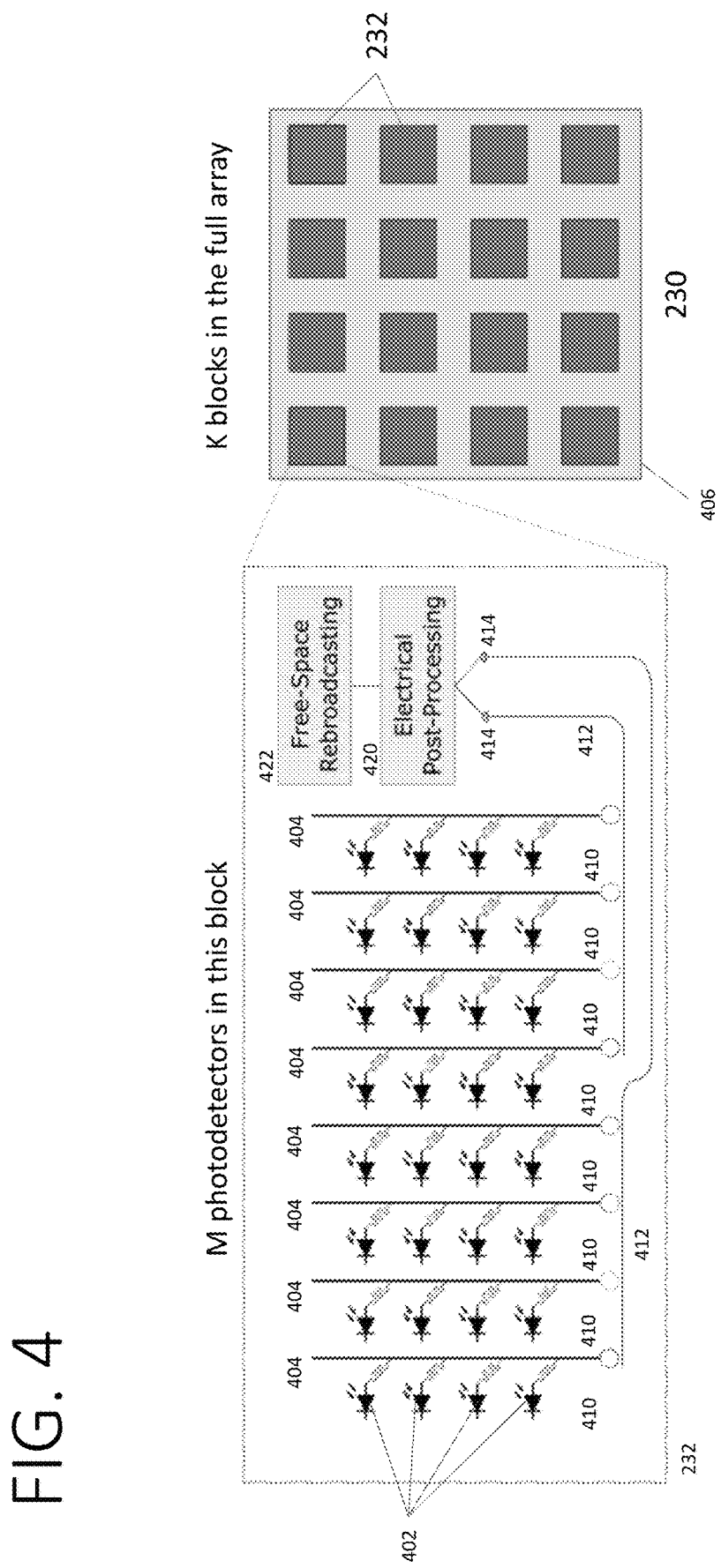

FIG. 4 illustrates an implementation of weighting and summation in the receiver array of FIG. 2A, with M photodetectors per block and K blocks, for a total of M×K photodetectors in the whole receiver array.

Figure 5:
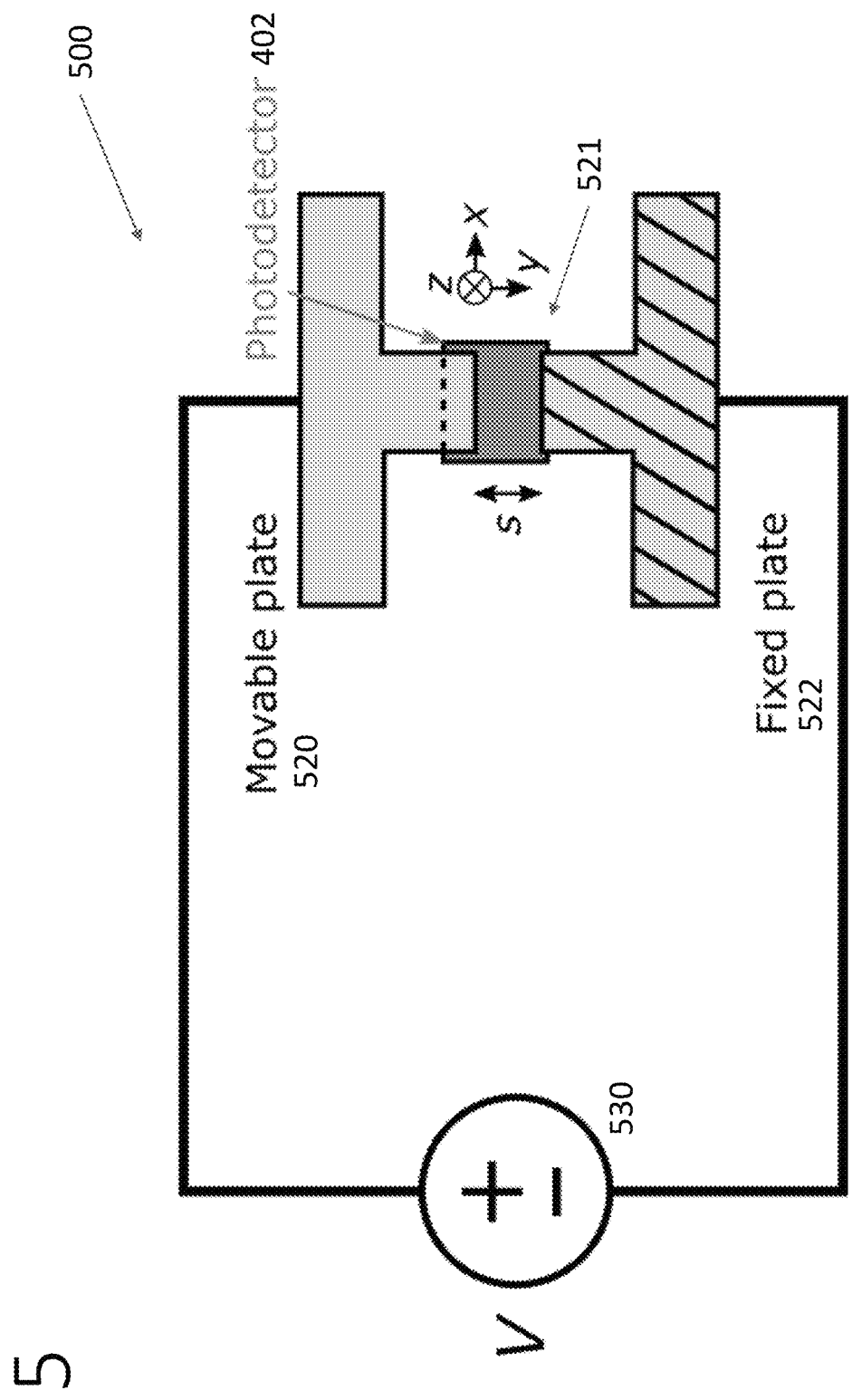

FIG. 5 illustrates a NEMS slot waveguide of variable width s and plate depth W (depth is along z dimension) suitable for static weighting in the blocks of FIG. 4. The plates can be spaced apart from the photodetectors by a distance of about 1μm.

FIG. 6 illustrates a two-dimensional (2D) FDTD simulation of transmission through the NEMS slot waveguide in FIG. 5 assuming good coupling and confinement in x.

Figure 7A:
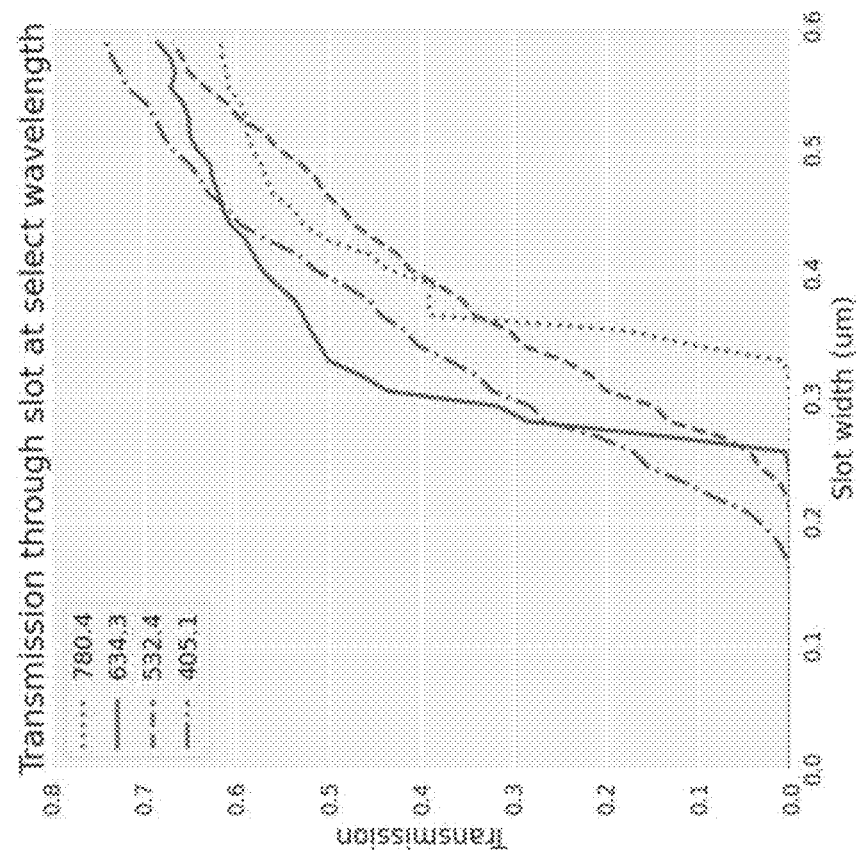
Figure 7B:
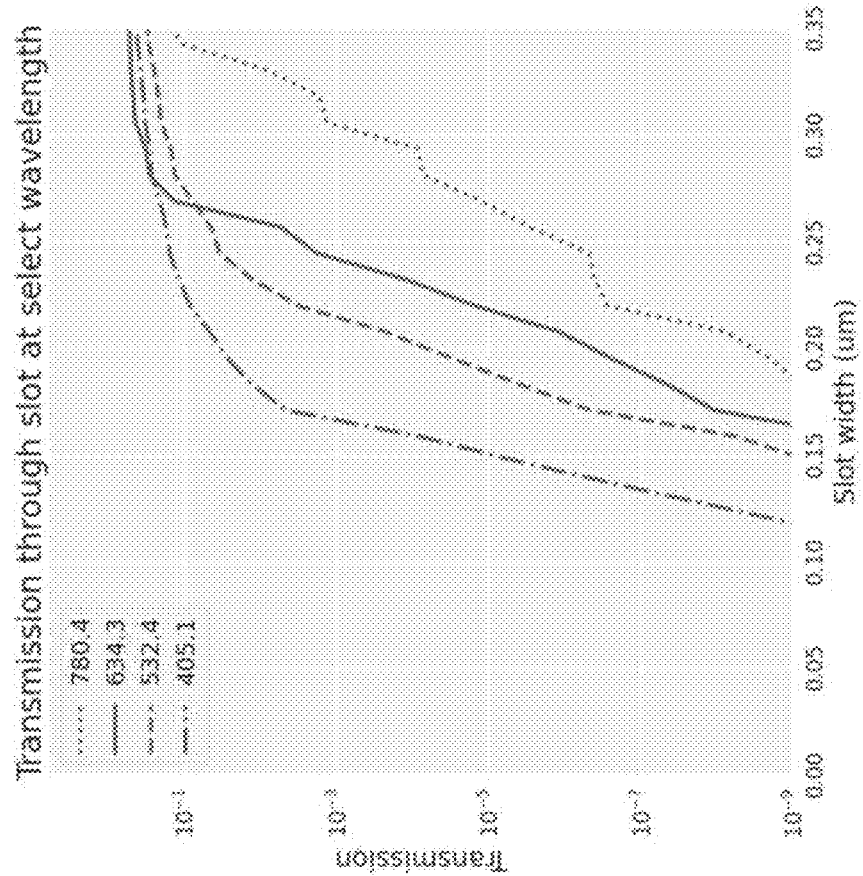

FIGS. 7A and 7B illustrate simulated optical transmission at different scales through the NEMS slot device of FIG. 5 using the 2D FDTD modeling of FIG. 6 at wavelengths of 405.1 nm (dashed-dotted line), 532.4 nm (dashed line), 634.4 nm (solid line), and 780.4 nm (dotted line).

Figure 8:
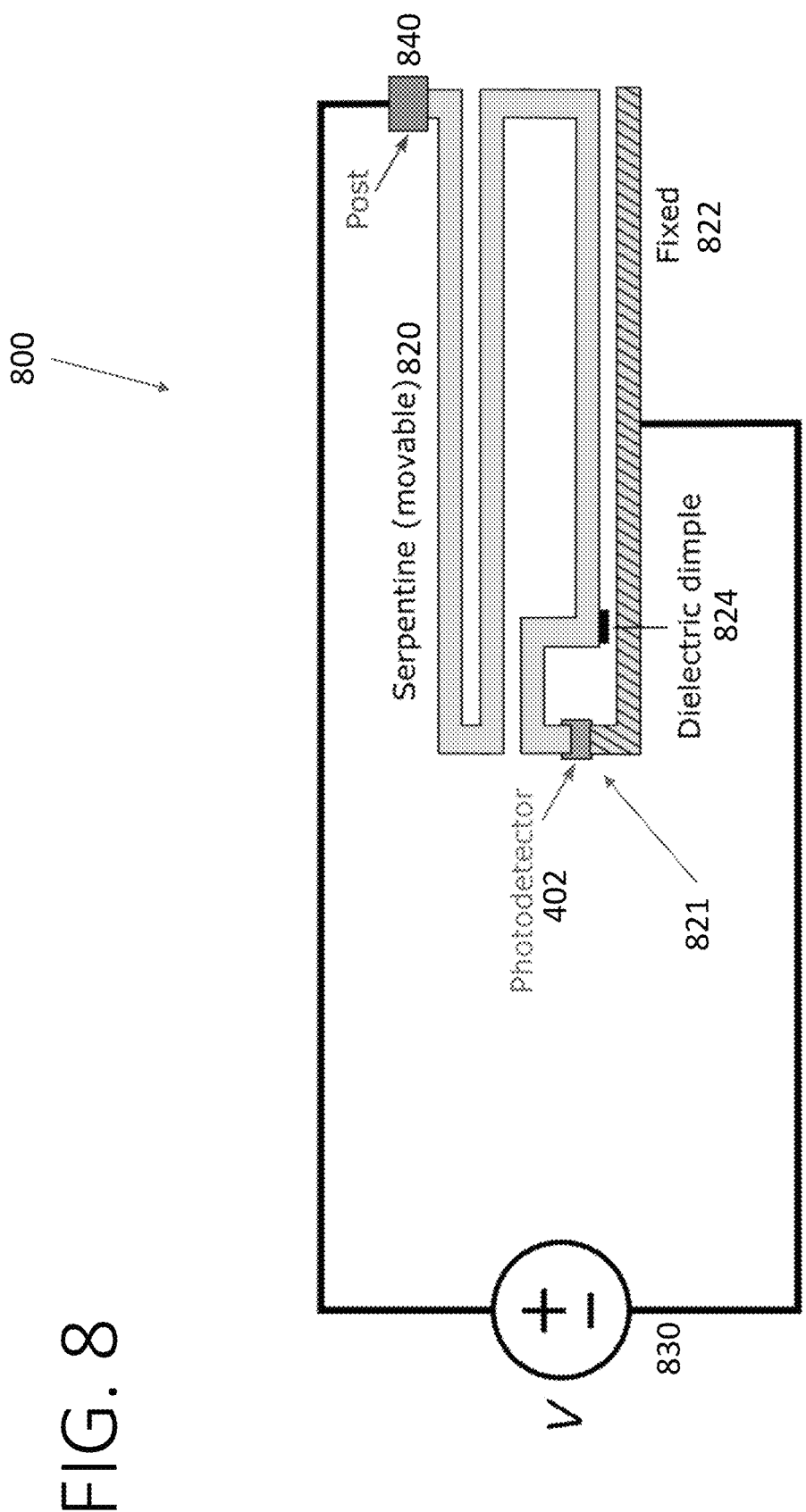

FIG. 8 illustrates a NEMS serpentine structure suitable for weighting in the blocks of FIG. 4. The NEMS serpentine structure produces high slot width variation with compact area at low voltage (2.2 V). A dielectric dimple stops the electrodes from being pulled together.

FIGS. 9A-9C illustrate force on and deflection of the NEMS serpentine structure in FIG. 8.

Figure 10:
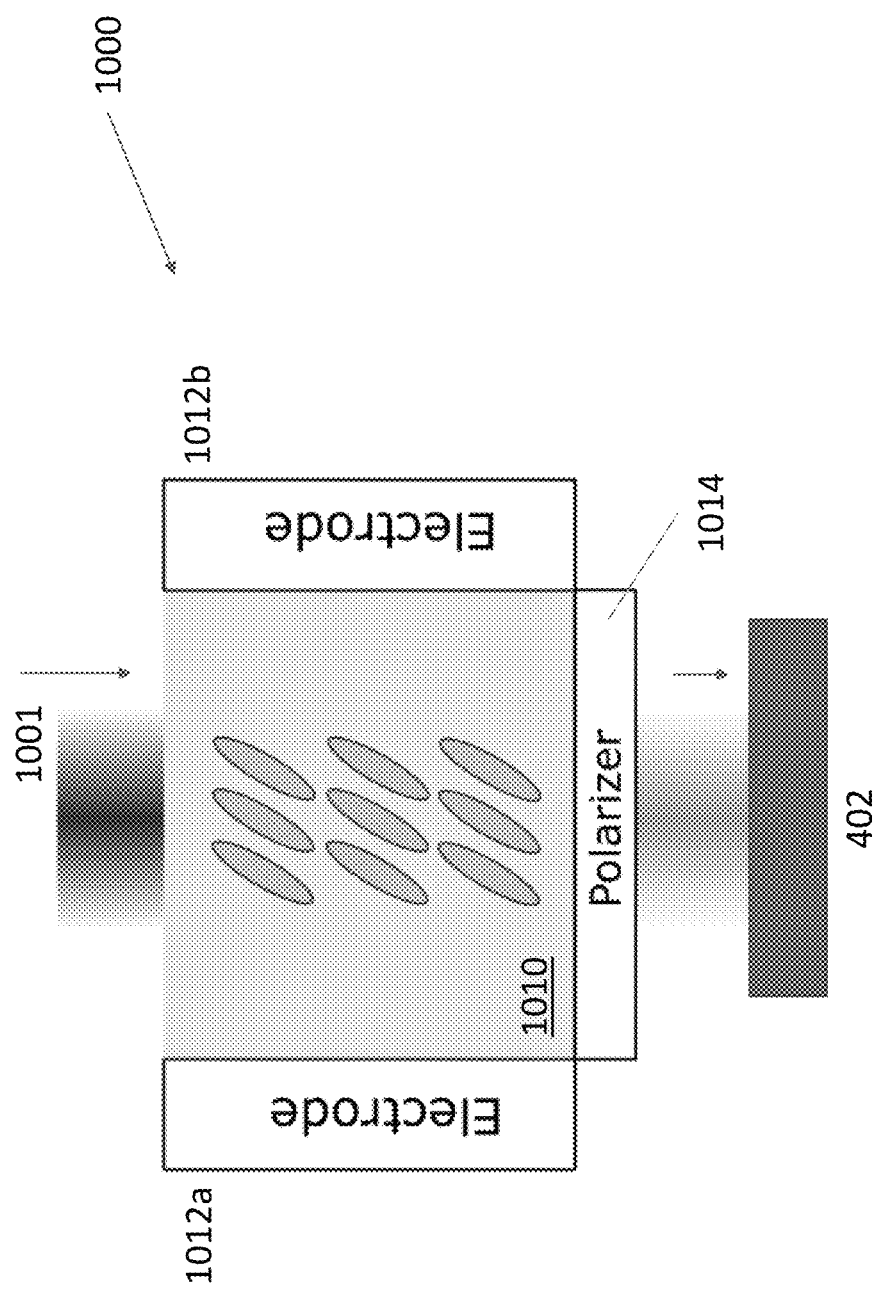

FIG. 10 illustrates weighting of an optical input using spatial light modulation via liquid crystal, where the extraordinary refractive index shift leads to rotation of the polarization of the input light.

Figure 11:
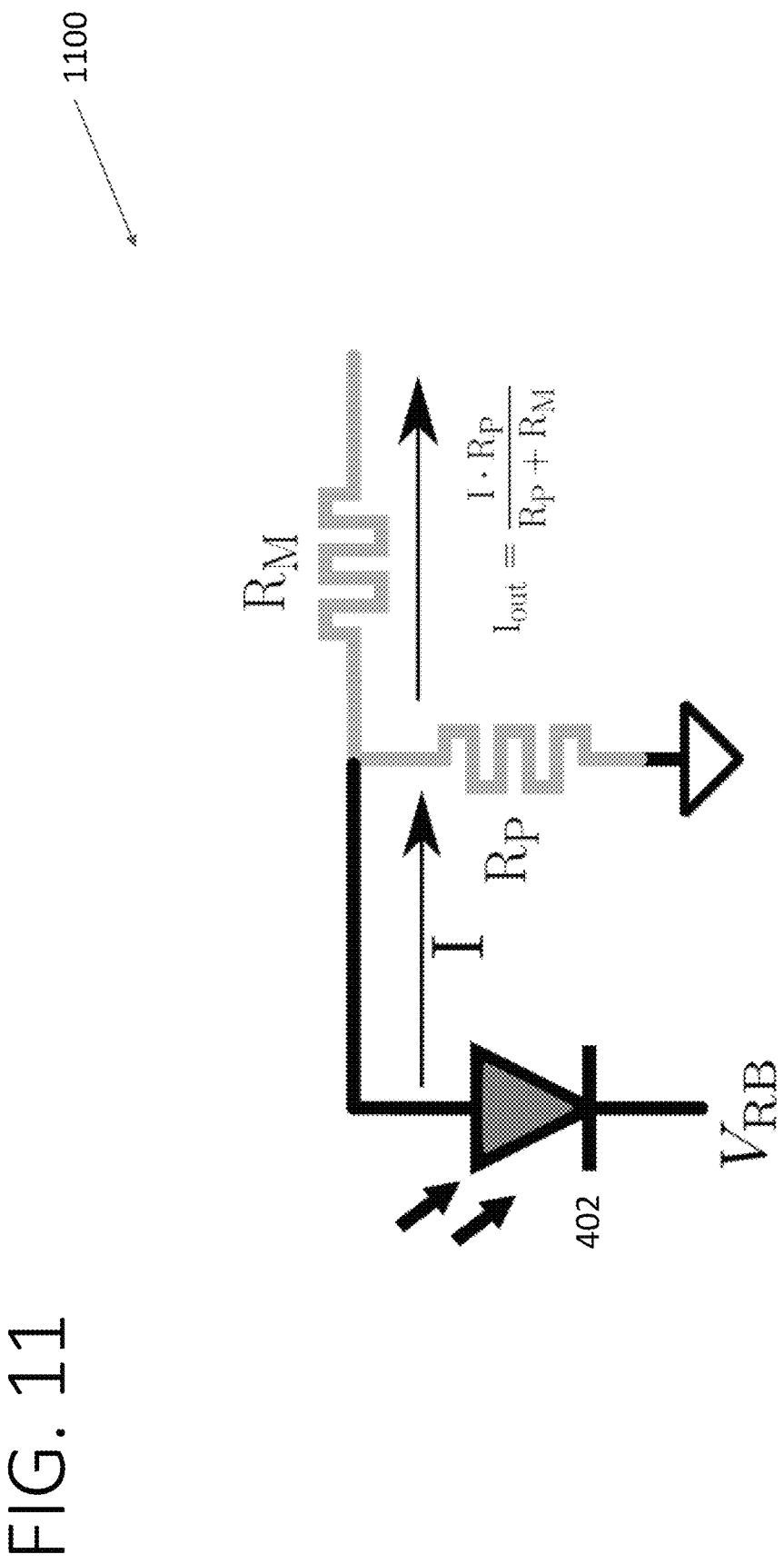

FIG. 11 illustrates weighting of an optical input through a memristive current divider coupled to the output of the photodetector.

Figure 12:
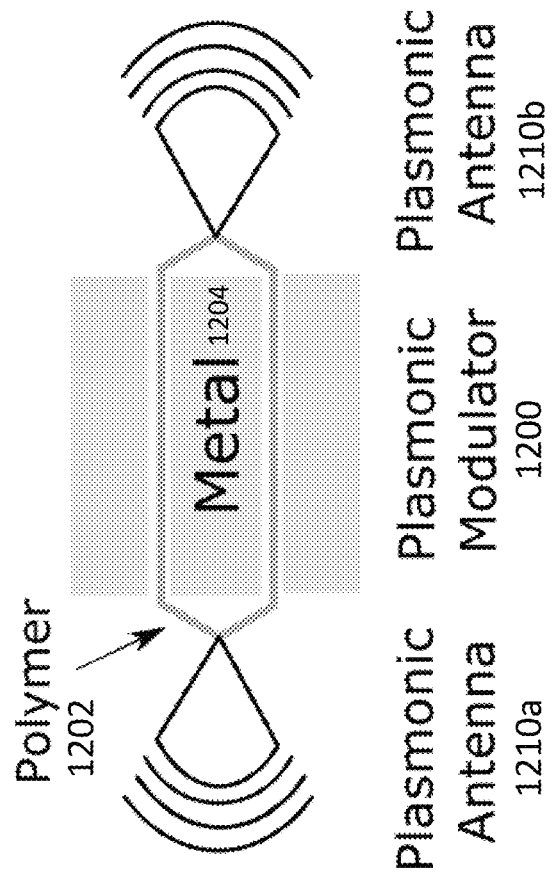

FIG. 12 illustrates weighting of an optical input by a plasmonic slot waveguide modulator.

Figure 13:
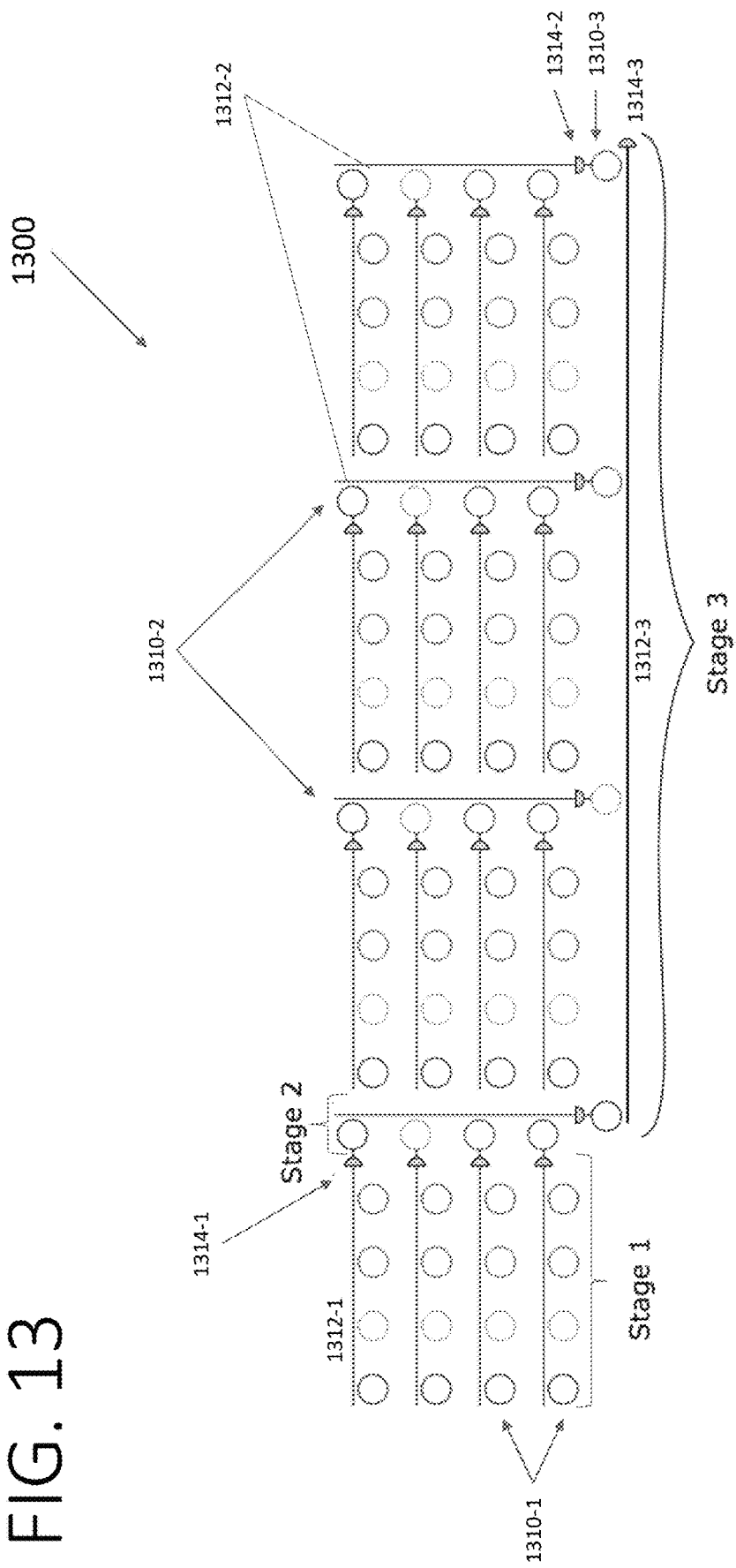

FIG. 13 illustrates signal summation via multiple stages of ring resonators in an optical bus for a receiver block or an array of receiver blocks.

Figure 14:
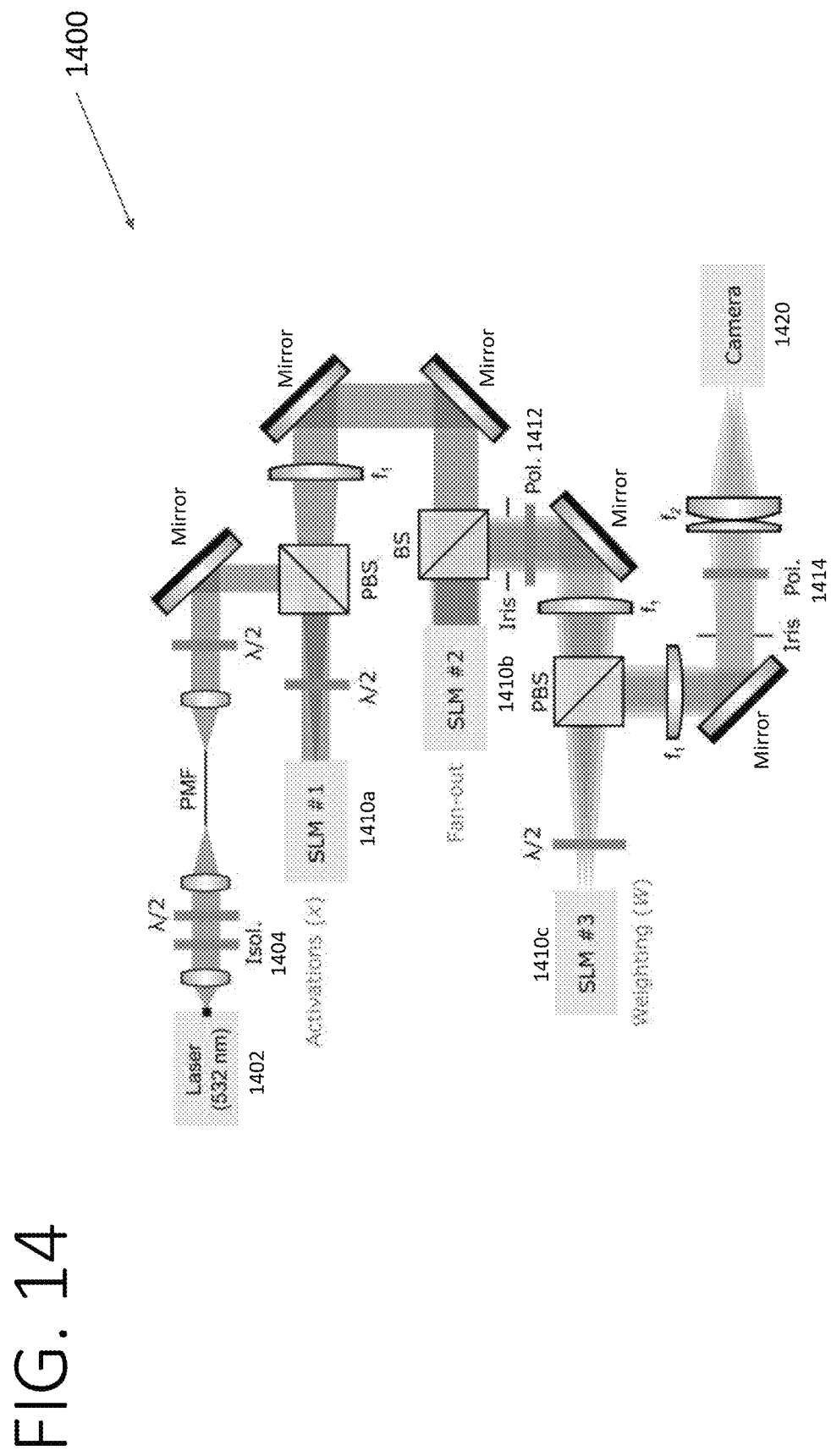

FIG. 14 illustrates an experimental implementation of the photonic tensor processor in FIG. 2A.

Figure 15B:
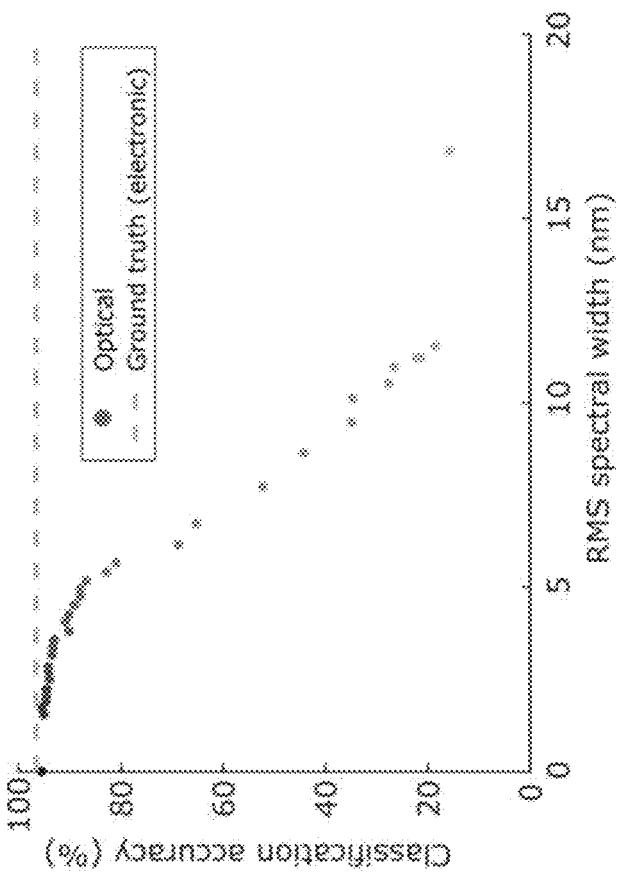
Figure 15A:
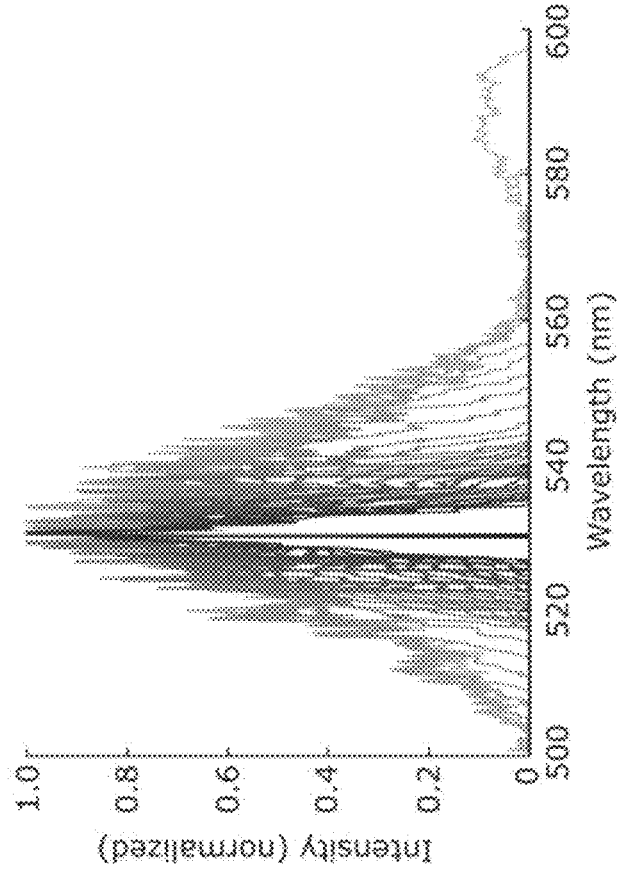

FIG. 15A is a plot of normalized output spectra for a diode laser (narrow peak at 532 nm) and a supercontinuum laser (other traces).

FIG. 15B is a plot of the dependence of classification accuracy on source root-mean-square (RMS) spectral width for the experimental system shown in FIG. 14 modified to include a supercontinuum laser with filtered spectra and a mirror instead of the third SLM, with weighting performed electronically.

DETAILED DESCRIPTION

Deep neural networks (DNNs) can perform image classification and natural language processing. As DNN applications grow more complex, the DNN size tends to increase; however, the DNN application space is constrained by the performance limits of digital electronic hardware (namely, latency and power consumption set by thermal management and Moore's law). Here, we present a scalable ultralow latency photonic tensor processor that computes DNN layer outputs in a single shot (~10 ns) with passive optical copying and static "weight stationary" weighting of inputs. Optical neural networks promising very low energy usage have previously been proposed to accelerate machine learning, but fully integrated weight stationary architectures tend to be limited in scalability by constraints on control, multiplexing, programmability, component area, and insertion loss, while output stationary architectures take multiple clock cycles to compute outputs by the nature of their dataflow.

Our processor leverages the advantages of free-space optics for large-scale distribution of an input vector and integrated optoelectronics for tightly packed static weighting elements and postprocessing operations (e.g., nonlinearity). For computation of one layer of a fully connected neural network (FCNN), a source array encodes the input activations, a passive diffractive optical element copies (fans out) these inputs, and passive, reconfigurable weighting elements apply the weights. Closely integrated, micron-scale photodetectors collect the signal at each pixel, and block-wise summation is performed in the analog electronic domain by Kirchhoff's current law before conversion to the digital electronic domain.

An example, relatively small photonic tensor processor is capable of computation with an energy cost on the order of about 10 fJ per multiply-and-accumulate (MAC) and a latency on the order of about 10 ns for a million-element matrix-vector product. These energy and latency bounds are orders of magnitude better than the current state of the art, and the energy bound can be even lower for larger matrix sizes. These advances can enable next-generation DNNs and potentially have a significant impact on other fields such as Ising machines, complex optimization, and other machine learning tasks, where matrix-vector multiplication also dominates energy consumption and latency.

Dataflow

Figure 1A:
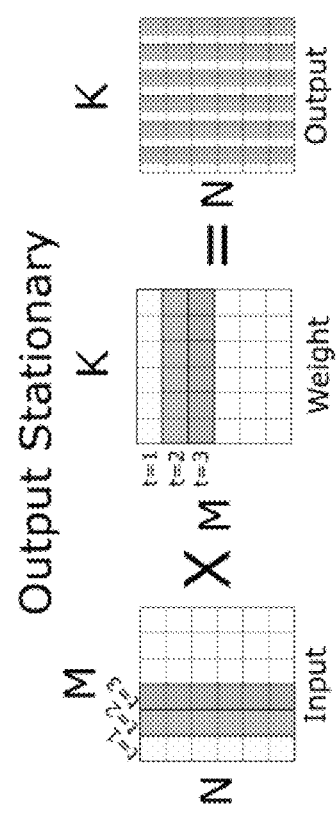
FIG. 1A illustrates an output stationary dataflow.
Figure 1B:
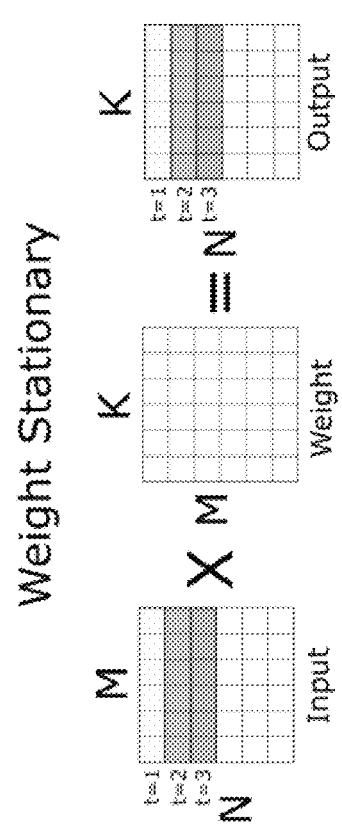
FIG. 1B illustrates a weight stationary dataflow in which an entire matrix-vector product is computed in one time step.

FIGS. 1A and 1B illustrate the primary ways of iterating over data when computing matrix-matrix products. The first, shown in FIG. 1A, is called output stationary, where the common dimension of the input and weight matrices (M) is stepped through in time. On each time step, a vector-vector outer product is performed, causing partial charge to accumulate on a 2D receiver array. The process of time-multiplexing has many benefits, such as a decrease in the number of components to encode input and weight values. However, this time multiplexing takes M time steps to compute either a matrix-matrix or matrix-vector product. In contrast, a weight stationary dataflow, shown in FIG. 1B, iterates through the batching dimension of the input matrix (N) over time. The output vector from a matrix-vector product can therefore be read out after a single time step, allowing ultra-low latency computation.

Photonic Tensor Processor Architecture and Operation

FIGS. 2A-2E illustrate possible architectures for a photonic tensor processor 200 that computes the product of an input vector and a weight matrix. FIG. 2A shows the photonic tensor processor 200 in detail, with free-space imaging optics 220 and opto-electronic computing blocks 232 in a receiver array 230. A high-speed 2D input array 210, such as an SLM, laser or LED array, or other display, encodes an analog input vector x (e.g., of length M=1 million) into an analog spatial amplitude distribution (e.g., in an array of size 1,000×1,000) of a wavefront generated by one or more lasers or other light source(s) (not shown). The analog spatial amplitude distribution can also be generated with an array of lasers (e.g., a vertical-cavity surface-emitting laser (VCSEL) array), a light-emitting diodes (LED) array, a display, or other set of single-spatial-mode, coherent or incoherent light sources. The free-space imaging optics 220 perform massive-scale fan-out of each point in the input vector to K blocks in the receiver array 230, which weights the input vector according to the weight matrix and detects the weighted products of the input vector and the weight matrix as described below.

FIGS. 2B-2D illustrate different ways in which the imaging optics 220 can perform massive optical fan-out of the input vector onto the receiver array 230. FIGS. 2B and 2C illustrate a fan-out scheme using a Fourier lens 222 and a phase mask 224 or diffractive optical element with suitably programmed pixels. The phase function encoded by the phase mask 224 is chosen to replicate the input vector onto the receiver blocks 232 in the receiver array as described below. In FIG. 2B, uniformly illuminating the phase mask 224 with a flat field and spatially Fourier transforming the phase mask 224 with the Fourier lens produces a two-dimensional (2D) spot array in the plane of the receiver array 230.

The phase mask 224 can be fixed or reconfigurable. For example, the phase mask 224 can be implemented with an array of optical phase change material cells or a liquid crystal display that can be updated or changed in a pixel-wise fashion, allowing almost arbitrary relocations of replicas of the input pattern. Once the phase mask 224 has been programmed or set, it does not consume energy. In other words, the phase mask is static and does not consume power during neural network inference but can be updated if the neural network model changes.

In FIG. 2C, the receiver array 230 is again in the Fourier plane of the same phase mask 224, which is now in the Fourier plane of an input array 228 (thanks to another lens 226 between the phase mask 224 and the input array 228). In other words, the intensity in the phase-mask plane is the product of the phase mask 224 and the spatial Fourier transform of the input array 228. Then, the image on the receiver array 230 in FIG. 2C is the convolution of the input array 228 and the spot array (spatial Fourier transform of the phase mask), which yields the desired fan-out. The input amplitude mask could be made up of individual lasers, such as a VCSEL array, for high optical input power.

FIG. 2D illustrates fan-out with an array of beam splitters 221 and/or mirrors 223 instead of a phase mask. The arrangement of the beam splitters 221 and mirrors 223 depends on the sizes and pitches of the blocks in the receiver array. In this example, the beam splitters 221 are separated laterally by millimeters and extend over a distance of meters in the axial direction. The beam splitters 221 split an input beam in the vertical (left) and horizontal (right) directions to produce an array of beams, each of which has a fraction of the input beam's power. The mirrors 223 redirect the beams from the horizontal-splitting beam splitters 221 to the vertical-splitting beam splitters 221.

The blocks 232 in the receiver array 230 detect up to a trillion fanned-out beams from the imaging optics 220 and weight them with up to a trillion static weights in a weight stationary dataflow as in FIG. 1B. Each block 232 in the receiver array 230 contains M weighting devices and computes the value of one output activation. For M=K=1,000,000, the receiver array includes a trillion static, CMOS-compatible weighting devices connected to each other, with 1,000,000 weighting devices per block. The weighting devices encode the weights statically to reduce energy consumption. Together, the free-space optical fan-out and receiver array in this photonic tensor processor scale a weight-stationary array significantly beyond existing hardware sizes (e.g., to 1 million×1 million processing elements and beyond).

FIG. 2E shows the photonic tensor processor 200 implementing one layer in a DNN together with a digital-to-analog converter (DAC) 202 at the input and electronics at the output, including electronic-domain summation blocks 240, transimpedance amplifiers (TIAs) 242, analog-to-digital converters (ADCs) 244, and electronic nonlinearity blocks 246 (e.g., comparators). An array of VCSELs or μLEDs 210 encodes analog domain input activations from the DAC 202, e.g., at approximately GHz rates (the light sources can be temporally coherent or incoherent). A diffractive optical element in the imaging optics 220 passively copies these inputs and transmits the fanned-out input activations to the receiver array 230.

The receiver array 230 includes reconfigurable weighting elements that weight the input activations without consuming energy. It also includes closely integrated, micron-scale photodetectors (PDs) that collect the signal at each pixel. (For single-shot matrix-vector computation, there should be 2·K·N weighting elements and receivers, where the factor of 2 accounts for negative weight encoding.)

Each element may include a single photodetector for detecting real-valued, positive signals or time-multiplexed, complex and/or negative signals, with different components being transmitted in different time bins (e.g., positive and negative values detected in alternating time bins). There may be an analog switch that flips the photodetector output to negate the weighting values. An element may also include two photodetectors, with one photodetector whose output is subtracted from the other photodetector's output to produce negative values.

Block-wise summation of the photocurrents from the photodetectors is performed in the analog electronic domain by Kirchhoff's current law. Alternatively, the receiver array 230 could include one large photodetector per block 232 with 'optical fan-in'—this solution is nearly equivalent to individual micron-scale photodetectors since different diffraction-limited spatial modes at the same wavelength and polarization cannot be overlapped by the Second Law of Thermodynamics.

The TIAs 242 reads out the accumulated charge from the PDs. ADCs 244 converted the outputs of the TIAs 242 from the analog domain to the digital domain. Electronic post-processing units 246 (e.g., comparators) perform other steps in DNN inference, such as the nonlinearity NL. Finally, one output source per block (e.g., VCSEL, not shown) 232 broadcasts the output activations to free space for the next layer of computation.

FIG. 3 illustrates a matrix depiction equivalent to the fan-out and processing performed by the photonic tensor processor 200 of FIG. 2A. The upper row of FIG. 3 shows a vector of input activations (x) multiplying a weight matrix (W) to produce an output vector (y). The photonic tensor processor 200 operates by rearranging the elements of the input vector (x) into a 2D input vector array with the SLM 210 (or a laser array or other display), while each block 232 in the receiver array 230 encodes one column of the weight matrix (W) in a corresponding 2D array. The imaging optics 220 replicate and fan out the 2D input vector array onto each block of the receiver array as shown at bottom left of FIG. 3. Each block 232 in the receiver array 230 computes and accumulates the partial products of the vector elements and corresponding weight matrix elements to produce a corresponding element in the output vector (y).

Receiver Blocks for a Photonic Tensor Processor Receiver Array

FIG. 4 illustrates an implementation of weighting and summation in the receiver array of FIG. 2A, with M photodetectors per block and K blocks, for a total of M×K photodetectors in the whole receiver array. Weighting (multiplication) can be implemented with nanoelectromechanical systems (NEMS), a liquid crystal modulator, a memristor connected to a photodiode, a plasmonic slot waveguide modulator, or an optical phase change material (PCM). In neural network inference, as long as the weight matrix size is under 1 million×1 million, the weights do not need to be updated in this system. The photodetectors are connected along a copper wire or other conductor, where Kirchhoff's current law performs the summation. More copper wires are added in parallel, with readout by ring modulators to an optical bus, and summation on a broadband photodetector. (The maximum numbers of photodetectors and memristive devices (if used) and maximum length are set by current capacity and RC time.) Once the maximum number of wavelengths has been added to the optical bus, additional wavelengths can be transmitted in distinct spatial modes using another optical stage and/or more copper wires connected to a separate bus. Alternatively, analog buffers could connect the columns of copper wires instead of the transmission and summation in optical buses.

FIG. 4 shows one possible implementation of one block of M elements in the receiver array 232 of the photonic tensor processor 200 in FIG. 2A. Short (e.g., ~1 mm long) electronic wires 404 connect a modest number of photodetectors 402 (e.g., 1,000 photodetectors 402 of pitch 1μm per wire 404, with 1,000 wires 404 total) with values summed by Kirchhoff's current law. The output of each photodetector 402 is amplitude-modulated by a corresponding static weighting device (not shown), for example, a NEMS slot waveguide, liquid crystal SLM pixel, plasmonic slot waveguide modulator, or optical PCM that attenuates the incident beam by a fixed amount or a memristive current divider that attenuates the photocurrent emitted by the photodetector 402 by a fixed amount. The amount of attenuation represents the value of the corresponding weight in the weight matrix. The photodetectors 402 can be low-capacitance "receiverless" devices or the end of each wire 404 in FIG. 4 can be connected to a transimpedance amplifier (TIA; not shown).

Each wire 404 is attached to an energy-efficient linear electro-optic modulator, shown in FIG. 4 as a ring resonator modulator 410. The modulator 410 at the end of each metal wire 404 encodes the summed charge at the end of the metal wire 404 into the intensity of light at a distinct wavelength in an optical bus (waveguide) 412. The optical bus 412 guides wavelength-division multiplexed (WDM) beams, each of which is modulated by a different ring resonator modulator 410. In this example, the first four rings modulate signals in the first optical bus 412 at four distinct wavelengths and the next four rings modulate signals at the same wavelengths in a second optical bus 412.

Alternatively, analog electronics (not shown) can be used to read out the photodetectors 402. In this technique, each column is buffered by an active analog buffering device (such as a transistor), which is designed to have minimal power consumption and high bandwidth. The buffered outputs of the columns are then summed together in the electrical domain according to Kirchoff's current law/charge conservation principles.

With a finite number of wavelengths supported in the optical bus 412 (e.g., each bus 412 may guide about 100 wavelengths at a wavelength spacing of 0.25 nm), each block 232 can have multiple optical buses (waveguides) 412 that support distinct spatial modes at the same or overlapping wavelengths or can be staggered over different optical stages as discussed below. In FIG. 4, for example, there are two optical buses (waveguides) 412, each of which supports four different wavelength channels (spectral bins). Each waveguide 412 routes the WDM beams from the modulators 410 to a corresponding broadband photodetector 414 in a bank of broadband photodetectors (where the number of photodetectors is the number of blocks multiplied by the number of spatial modes—in this example, 1,000,000 blocks with 10 spatial modes/buses per block yields $10^7$ photodetectors). Each broadband photodetector 414 incoherently sums the modulated WDM beams from the ring resonator modulators 410 on the associated optical bus 412. The outputs from the broadband photodetectors 414 are summed incoherently in the electronic domain and coupled to an electronic post-processing unit 420 that performs other steps in DNN inference, including analog-to-digital conversion, non-linearity, and max pooling. Finally, an optical element 422 (e.g., a laser modulated with the output of the electronic post-processing unit) broadcasts the data back out to free space for the next layer of computation (in the place of one source element in the input array shown in FIG. 2A). Analog to digital conversion may be omitted between neural network layers because the analog outputs of one layer can be broadcast to the next layer in the analog domain.

The photodetectors 402, wires 410, modulators 412, and optical buses 414 can be integrated onto a common substrate 406, with that substrate 406 hosting one or more blocks 232. The electronics in the electronic post-processing unit 420 can be integrated into the substrate 406 as well or formed as a separate unit that is electrically coupled to the broadband photodetectors 414, e.g., a read-out integrated circuit (ROIC) that is flip-chip bonded to the substrate. For example, it is possible to make about 70,000 receivers (1 mm by 1 mm chip) on a 300 mm silicon wafer (substrate). The wafer can hold the components together, or the components can be mounted or held on a printed circuit board (PCB)-type structure which routes out a few pads from each chip to a bank of programmable logic.

To reduce energy consumption, the modulators 412 can be implemented as CMOS-compatible modulators with very high electro-optic detuning efficiency. Each modulator 412 can be a ring modulator with a waveguide wrapped in a circular shape to make a guided resonant mode; a disk modulator with a circle that is in a substrate material and supports a resonant Whispering Gallery Mode; or a photonic crystal modulator which supports a resonant mode.

Here, we calculate the tuning efficiency for a resonant modulator composed of barium titanate (BaTiO$_3$ or BTO), which is a CMOS-compatible electro-optic material. Regardless of the modulator geometry, the change in refractive index from a linear electro-optic (Pockels) material is:

$$\Delta n = \frac{1}{2}n^3 rE = \frac{1}{2}n^3 r\frac{V}{d},$$

where n is the material's refractive index, r is the Pockels coefficient, E is the amplitude of the applied electric field, V is the applied voltage, and S is the spacing between the electrodes. With resonant modulators, the relative shift in wavelength from a shift in refractive index is:

$$\frac{1}{Q} = \frac{\Delta\omega}{\omega} = \frac{\Delta\lambda}{\lambda} = \frac{\Delta n}{n}\eta,$$

where η is the overlap of the optical mode with the perturbed region.

This fraction of the field within the perturbed region is about 38% for BTO on silicon with an electro-optic coefficient of 923 pm/V assuming a quality factor limited to about 50,000. The voltage to detune the resonant modulator by a linewidth is:

$$V = \frac{2d}{n^2 rQ\eta\zeta},$$

where n is the refractive index of barium titanate and ζ is the efficiency of the alignment of the electric field from the electrodes with the BTO's crystal axis (here, ζ=0.5). With the electrodes on either side of the waveguide, assuming conservatively that the electrodes are at a d=2.6 µm spacing so as to interfere as little as possible with the optical mode, then the modulation voltage is 0.1 V. This value can be further reduced by increasing the electro-optic coefficient of thin-film BTO (which is related to the quality of the thin-film) as well as engineering the optical overlap, quality factor, and electrode spacing.

Static Weighting Devices for a Photonic Tensor Processor

FIGS. 5-12 illustrate different devices for weighting an optical input signal with little to no static power dissipation. These "static devices" consume no power during regular matrix multiplication but can be reconfigured. FIGS. 5, 6, 7A, and 7B illustrate a NEMS slot waveguide 500 that uses an electrostatic force between two electrodes to actuate a gap or slot 521 between the electrodes. FIG. 5 shows a head-on view of the NEMS device 500 itself, with the photodetector 402 behind the slot 521 between a moveable plate 520 and a fixed plate 522. A voltage from a voltage supply 530 connected to the moveable plate 520 and fixed plate 522 controls the width s of the slot 521. Changing the slot width varies the intensity of light incident on the detector 402.

FIG. 6 illustrates a side view of a model for a 2D FDTD simulation of the optical transmission of a Gaussian beam 601 through the slot 521 in FIG. 5. The incident beam 601 is simulated as a Gaussian with a 1/e$^2$ diameter of 500 nm in a transverse electric (TE) mode to avoid subwavelength guided modes (surface plasmon-polaritons), which are transverse magnetic (TM) modes. In FIG. 6, the beam 601 propagates from left to right through the slot 521, which is between shaded areas representing the moveable plate 520 and fixed plate 522, to the photodetector 402 at far right. In this simulation, the slot thickness s and the distance between the slot 521 and the photodetector 402 are each 1 µm.

FIGS. 7A and 7B both show transmission (fraction of transmitted light) versus slot width s (microns) simulated using the model of FIG. 6 for light at wavelengths of 405.1 nm (dashed-dotted lines), 532.4 nm (dashed lines), 634.4 nm (solid lines), and 780.4 nm (dotted lines). FIG. 7A shows the transmission over a range of slot widths from 0.0 µm to 0.6 µm, and FIG. 7B shows the transmission over a range of slot widths from 0.0 µm to 0.35 µm (0 nm to 350 nm). The plots show that there is approximately zero transmission with a slot width of <100 nm and a roughly linear increase in transmission for slot widths of about 200 nm to about 300 nm.

FIG. 8 shows a NEMS slot waveguide 800 with a moveable serpentine or spring-like structure 820 that produces a relatively large displacement (e.g., 100 nm) at CMOS-level voltages. The moveable serpentine structure 820 and a fixed plate 822 form a slot 821 in front of the photodetector 402. A voltage source 830 coupled to the moveable serpentine structure 820 and fixed plate 822 applies a voltage that sets the slot width. A dielectric dimple 824 on the moveable serpentine structure 820 (or on the fixed plate 822) prevents the moveable serpentine structure 820 and fixed plate 822 from touching each other and possibly sticking together. And a metal post 840 holds the serpentine structure 820 and can be used to set the voltage of the serpentine structure 820 from the voltage source 830. If the serpentine structure 820 has three "coils," each of which is 40 µm long, 500 nm wide, and 1 µm tall, applying 2.2 V is enough to displace the serpentine structure 820 and change the slot width by 90 nm. This range allows for roughly five orders of magnitude of transmission change at visible wavelengths.

FIGS. 9A-9C illustrate an analytical model for analyzing the behavior of the serpentine structure 820 in FIG. 8. FIG. 9A illustrates the serpentine structure 820 as made of several individual horizontal cantilever segments attached to each other with small vertical segments. The entire serpentine structure 820 is pulled towards a stationary electrically charged metal slab 822. FIG. 9B shows an individual section or cantilever segment of the serpentine structure 820. Each cantilever segment is approximated as stationary/grounded relative to the small vertical segment to which it is attached. In other words, vertical displacements from the cantilever segment add in series and horizontal displacements are negligible in the small bending regime.

FIG. 9C illustrates a model of the bending of an individual cantilever segment with a length L, height H, and width W, where a point force is applied to the end of the cantilever segment. The radius R is the radius of bending relative to the neutral axis of the beam (center of the beam). FIG. 9C also shows the relationships among θ, dy, dθ, and ds for a small segment dx of the beam with a deflection angle dθ. Rearranging these relationships yields an equation that governs the steady-state behavior of the cantilever (bottom equation, FIG. 9C). Further, we can use a relationship between the total moment of the cantilever (M), the moment of inertia (I), and Young's modulus (E) to make a substitution for R.

The relationship between the point force (F) and total moment can be written as:

$$M = F(x-L).$$

And from FIG. 9C, we also have:

$$\frac{d^2 y}{dx^2} = \frac{1}{R} = -\frac{M}{EI}.$$

Posing the moments equal to each other and using the boundary conditions that y(x=0)=0 (no displacement at ground) and dy/dx=0 at x=0 (continuity of derivative at the boundary), double-integrating the second order differential equation above yields:

$$y = -\frac{x^3}{6}\frac{F}{EI} + \frac{FLx^2}{2EI}.$$

We can now determine the point of maximum deflection along the beam (x=L):

$$y_{max} = \frac{L^3 F}{3EI}.$$

The electrostatic force between two parallel plates can be derived by realizing that the work done to move two plates is equal to the energy to put charge on those plates. The energy to charge a capacitor is ½×Q×V and the work done moving two plates is F×y, where F is force and y is the distance moved. The electric field generated by this voltage is V/S, where S is the separation (gap or slot width) between the plates. This gives the following expression for the force:

$$F = \frac{1}{2}Q\frac{V}{S} = \frac{1}{2}\left(\frac{\epsilon_0 AV}{S}\right)\left(\frac{V}{S}\right) = \frac{\epsilon_0 AV^2}{2S^2}.$$

Adding N cantilevers in series causes the effective displacement of the cantilevers by a fixed force F to increase linearly. Including this factor of N, and substituting the force and moment of inertia into the displacement equation gives a maximum displacement of:

$$y_{max} = \frac{2\epsilon_0 V^2 N}{EH}\left(\frac{L^4}{S^2 W^2}\right).$$

In this final equation, the geometric parameters that can be easily changed are grouped together.

To make the displacement as large as possible, the cantilever length L should be as large as possible and the cantilever width W should be as small as possible. The slot width S (the gap between the serpentine structure and fixed plate) should be as small as possible. If the slot width S and cantilever width W are as close to the limit of what the foundry allows (S=W), then the maximum deflection is:

$$y_{max} = \frac{2\epsilon_0 V^2 N}{EH}\left(\frac{L^4}{W^4}\right).$$

Next, consider reasonable values for post-process metal layers from the back-end of the line of a CMOS foundry. For a copper serpentine structure with a Young's modulus (E) of 117 Gigapascal, three "coils" (N=3), height H=1µm, length L=40 µm, width W=0.5 µm, and applied voltage V=2.2 V, the maximum displacement is about 90 nm.

FIG. 10 is top view of a liquid crystal modulator 1000 that can be used instead of an adjustable NEMS slot waveguide to implement weights in a photonic tensor processor. The modulator 1000 includes liquid crystal material 1010 sandwiched between a pair of electrodes 1012a and 1012b (collectively, electrodes 1012), which are parallel to an incident beam of light 1001. The beam of light 1001 propagates through the liquid crystal material 1010, between the electrodes 1012, and through a polarizer 1014 in optical series with the liquid crystal material 1010 to a photodetector 402.

Applying a voltage across the electrodes 1012 modulates the orientation of the liquid crystal molecules 1010, producing an extraordinary refractive index shift that rotates the polarization of the incident light 1001. In other words, the liquid crystal material 1010 acts as a tunable wave plate that rotates the polarization of the incident beam 1001 by amount that depends on the voltage applied to the electrodes 1012. The polarizer 1014 converts this polarization rotation into an amplitude modulation. Assuming low leakage, this voltage and hence the amplitude modulation can be maintained with very little static power dissipation. Applying an occasional reset pulse prevents electroplating.

FIG. 11 shows a memristor current divider 1100 that can be used instead of an adjustable NEMS slot waveguide or liquid crystal modulator to implement weights in a photonic tensor processor. The memristor current divider includes the photodiode 402 connected in parallel to memristors $R_M$ and $R_P$. Programming pulses set the resistances of the memristors, and the resistances remain static thereafter. For weighting, the two memristors divide the generated photocurrent I from the photodetector 402. ($R_M$ is also variable to increase the dynamic range.) The memristors are nonvolatile and thus consume no static power.

FIG. 12 is a top-down view of an example plasmonic modulator 1200. This plasmonic modulator 1200 can be used to weight the amplitude of a beam incident on a detector (not shown). Applying a voltage to the plasmonic modulator 1200 attenuates the optical signal coupled to the detector. The plasmonic modulator 1200 uses an electrooptic material, such as a nonlinear electrooptic polymer 1202, and plasmonic antennas 1210a and 1210b (collectively, plasmonic antennas 1210) to generate a plasmonic slot for tight confinement of light and electric field enhancement. The nonlinear electro-optic polymer 1202 is a material whose refractive index changes in response to an external electric field. When light is near metal, it creates a "plasmonic" mode where the light is closely coupled to the metal. Because of this, the metal gap that supports the light can be made really small and the drive voltage significantly lower as well as the device size being decreased. The plasmonic antennas 1210 are metal grating couplers that can couple the light in and out of the chip. The detector can either replace one of the plasmonic antennas 1210 or be located on a separate detector chip. In the latter case, light enters an array of these weighting elements simultaneously from one grating coupler 1210a and leaves to the detector array through the other grating coupler 1210b.

Another option for passive weighting of the received inputs is a thin film of an optical phase change material (PCM; such as $Sb_2S_3$, $Sb_2Se_3$ or GSST) placed on top of each photodetector to vary the optical absorption of a receiver pixel. The PCM's voltage response can be calibrated ahead of time to provide the desired absorption as a function of voltage, with weight updates can be implemented using a lookup table based on the calibration.

Energy Consumption

We now examine the energy consumption of an inventive photonic tensor processor, where the large parallelism, i.e., fan-out, allows for several traditionally expensive fixed costs to be amortized over a large amount of computation. If the weighting is static, then maintaining the weight values should consume no power. Since the weights are set once and then remain unchanged, we do not include the setting energy in the computation of energy consumption in regular inference operation. Memory access and data conversion between the analog and digital domains consume about 1 $pJ$ of energy per input and output value. Each input activation value is fanned out K times, where K can be >$10^6$. Each output activation value is the result of M computations, where M can also be >$10^6$. Charging the metal wires in the receiver array blocks consumes power to detune the ring modulators that couple light into the optical bus. An applied voltage (V) induces a shift in resonance of the rings ($\Delta\lambda, \Delta f$) that depends on the electro-optic coefficient (EO) and sets a bound on the system bandwidth.

If the voltage is on the order of $V_{ring}$=0.1 V and a multiply-and-accumulate (MAC) unit of wire has a length of about 1 µm the photon energy (including source inefficiency) to charge a wire is:

$$E_{photon} = \frac{1}{\eta} \cdot \frac{hv}{e}(C_{PD} + C_{wire} \cdot L_{PD}) \cdot V_{ring} = 40 aJ,$$

where $\eta$=0.5 is the wall-plug efficiency of the light source, hv/e is the bandgap of germanium (0.67 eV), $C_{PD}$ is the capacitance of a photodetector of area 1 µm² (0.1 fF), $C_{wire}$ is the wire capacitance (0.2 fF/µm), and $L_{PD}$ is the detector pitch (1 µm). This example calculation uses infrared (IR) wavelengths, though visible wavelengths may be more practical depending on the platform.

Post-processing, such as a nonlinearity, can be implemented in digital electronics. These costs are usually much less than 1 $pJ$ in energy since the rectified linear unit (ReLU) function is a simple comparison against zero in CMOS. Analog electronic circuits can also implement a nonlinearity.

TABLE 1

Energy consumption for a photonic tensor processor with K = M = $10^6$

| Component | Energy/MAC |
|---|---|
| Analog-to-Digital Converter (ADC) | ~1 pJ/value × 1 value/$10^6$ MACs = ~1 aJ/MAC |
| Digital-to-Analog Converter (DAC) | ~1 pJ/value × 1 value/$10^6$ MACs = ~1 aJ/MAC |
| Memory Access (DRAM/SRAM) | ~1 pJ/value × 1 value/$10^6$ MACs = ~1 aJ/MAC |
| Photon Energy | ~40 aJ/MAC (see above) |
| Post-Processing Electronics (Nonlinearity, etc.) | <1 pJ/value × 1 value/$10^6$ MACs = <1 aJ/MAC |

One reasonable question is whether the system will be limited by shot noise. The wires are charged through the detection of photons, where each MAC unit receives 20 aJ of optical energy at the receiver, or about 160 photons at a wavelength of 1550 nm. The standard deviation ($\sigma_i$) in photon number due to shot noise is the square root of the average number of photons. Therefore, for 160 transmitted photons, $\sigma_i \approx 13$ photons, which could lead to unacceptable errors in neural network output. That said, we are in fact taking the summation of M independent random variables. The total standard deviation is therefore:

$$\sigma = \sqrt{\sum \sigma_i^2} = \sqrt{M\sigma_i^2} = 13\sqrt{M},$$

with a signal-to-noise ratio (SNR) due to shot noise of $$SNR = \frac{160M}{13\sqrt{M}} = \frac{160}{13}\sqrt{M}.$$

With added noise in training, complex DNNs can maintain high accuracy in classification with up to about 4% noise (SNR=25), which is satisfied here with M≥5. When using the photonic tensor processor for very large problems (e.g., M up to $10^6$), this constraint is satisfied at both infrared and visible wavelengths.

Latency and Throughput

This photonic tensor processor can process an entire matrix-vector multiplication in a single shot. Assume that M=K=$10^6$, though the photonic tensor processor can be scaled further as discussed below. Also assume a standard computer clock rate of 1 GHz, though the clock rate can be made higher by shrinking the electrically connected unit cell to lower the RC time constant and by charging each wire with a higher voltage. The ensuing energy-latency tradeoff can be assessed for particular applications. The latency is bounded by the optical time of flight. If the light travels about 2 m between the input sources and the photodetectors, and each operation (DAC, electro-optic conversion, etc.) takes one computer clock cycle, then the latency for the full matrix-vector multiplication is on the order of 10 ns.

With these considerations, in terms of throughput, the photonic tensor processor can pipeline $10^{12}$ operations in 1 ns, corresponding to an output of $10^{21}$ FLOPS—in other words, zettaFLOPS of compute power. (Compare this value with the computing performance of top performing accelerators, which normally produce outputs of teraFLOPS, or $10^{12}$ FLOPS.)

Photonic Tensor Processors versus Digital DNN Hardware and Other Analog Hardware Standard digital hardware for inference processing is limited in energy consumption by data movement between memory and computation as well as digital multiply-accumulate (MAC) operations. This limitation for digital systems is about 100 fJ/MAC to about 1 pJ/MAC depending on the implementation and process technology, or three to four orders of magnitude higher than an inventive photonic tensor processor. In addition, since a photonic tensor processor can operate with little to no static power consumption, it is less hindered by <100% utilization of the hardware.

Memristor crossbar arrays for inference processing are limited in array size by the RC time constant of their interconnect. The resistance R and capacitance C of a wire are:

$$R = \frac{\rho L}{A}, \quad C = \frac{2\pi \epsilon L}{\ln(r_b/r_a)},$$

where ρ is the resistivity of the metal, L is the length of the wire, A is the cross-sectional area of the wire, ϵ is the permittivity of the dielectric surrounding the wire, and $r_b/r_a$ is the ratio of the radius of the outer conductor of an equal length of coaxial cable to the inner conductor. Generally, ln $(r_b/r_a)$=1 using the assumption that practical wires have a roughly square aspect ratio. Assume the length of the wire is greater than its width or height, i.e., $L^2$>A. The wire length is defined as L=mT, where m is the number of memristive devices attached to a wire and T is the pitch of those devices. Substituting, the RC time constant of the wire is therefore:

$$\tau = RC > 2\pi\rho\epsilon m_2.$$

This is a best-case estimate since it does not account for any additional deleterious effects, such as additional parasitic capacitances or parasitic resistances. For m=M=$10^6$, the 3 dB limited bandwidth is about 82 kHz for copper wires (resistivity of $1.68 \cdot 10^{-8}\Omega$m) clad in $SiO_2$ (refractive index n=1.44). Using the same calculation, the maximum number of devices for a 3 dB bandwidth of 1 GHz is 9,000.

A large memristor crossbar array can be partitioned into several smaller sub-arrays to improve scaling. However, to obtain single time-step matrix-vector products, each element of the input vector should be fanned out to the K weight memristors across the subarrays. In other words, each of the M computing devices has a separate wire, and each wire has K distinct destinations. While a large-scale distribution network with K=$10^6$ may be possible for a single activation (M =1) in an integrated platform (commonly accomplished with some effort for distribution of a single clock), it is often impractical to do this for M=$10^6$ simultaneously in the same platform due to spatial constraints.

Other photonic approaches to analog inference processing include a fully integrated, weight-stationary micro-ring weight bank using micro-ring resonators to encode weight values. However, the scalability of this architecture (in particular, M) is limited by the finite cavity finesse for the chosen material. In silicon photonics, well-designed modulators using carrier depletion have a finesse of about 100. The fundamental scaling of this architecture is set by the speed of operation of the system. Assuming 10 GHz of operation speed and a free spectral range equal to the optical frequency (about 100 THz), the finesse would be 10,000. The finesse can be increased, but at the cost of decreasing the available bandwidth for each resonator. The fundamental limit to vector length for this scheme is therefore on the order of 10,000. Integrated inference processors with optical phase change materials integrated onto rings for compactness and high extinction have similar scaling limitations. Inference processors with Mach-Zehnder modulators, on the other hand, are restricted due to the large areas consumed by their components.

Using free space and integrated optics with analog electronics as in an inventive photonic tensor processor circumvents these limitations. Furthermore, in contrast to other free-space matrix multipliers, the fan-out pattern is dynamically reconfigurable and can fan out to a 2D spot array rather than a 1D spot array (less sensitive to aberrations). The weighting elements, though static, are reconfigurable and can be updated if the model changes. And the photonic tensor processor implements matrix-vector multiplication directly, which permits the processing of standard DNN models.

Scalability of Photonic Tensor Processors

FIG. 13 illustrates how an inventive readout scheme provides a freely scalable method of summing spatially distinct signals. FIG. 13 shows ring modulators 1310 that read 64 distinct values with a single output photodetector 1314-3. The ring modulators 1310 are arranged in three cascading stages. Each modulator 1310-1 in Stage 1 encodes the sum of 1,000 products from photodetectors 1314-1 along corresponding wires. These modulators 1310-1 modulate transmitted light in a low-loss bus 1312-1 from an external source (e.g., a laser, not shown). The modulators 1310-2 in Stage 2 then modulate the light from another external source, and the waveguides 1312-2 guide the modulated light to detectors 1314-2, which drive modulators 1310-3 in Stage 3. Waveguides 1312-3 in Stage 3 guide the modulated light to the output photodetector 1314-3. The additional optical input in Stage 1 consumes energy, where enough optical energy should be incident on the detector-modulator pairs in Stages 2 and 3 to achieve modulation.

From above, the voltage to drive each modulator is about 0.1 V, with a detector-modulator capacitance of about C=18 fF (where about 15 fF is for the modulator 1310, about 3 fF is for a germanium silicon-on-insulator (SOI) photodetector 1312, and a negligible amount is from a roughly 1 μm long wire connecting the photodetector to the modulator). The optical energy per optical bus (waveguide) per time step is therefore about $E_{photon}=(1/\eta)(h\nu/e)CV_{ring}=2.4$ fJ. However, each optical bus contains data from 100 rings, or 100,000 inputs, and thus, the optical energy is amortized by a factor of 100,000 for an effective energy consumption of 0.024 aJ/MAC. Adding stages therefore adds a negligible amount of energy to the overall energy consumption and enables the addition of signals from a large number of 1,000-element-long electronic wires. The same reasoning applies from Stage 2 to Stage 3. This makes this photonic tensor processor effectively freely scalable in terms of energy consumption.

Photonic Tensor Processor Area

Wafer area is a useful metric for evaluating or comparing neural network systems as it is a dominant contributor to the cost-effectiveness of the overall system. TABLE 2 lists the device areas on the integrated wafer for each of the static weighting devices presented above. The limiting elements in terms of area are the weighting devices. In the case of the memristor design, an array of 1 million×1 million memristors has an area of 1 m$^2$, which is equivalent to 15 wafers of 300 mm diameter, giving a compute density of 1 zetta-FLOPS/m$^2$, or 100 petaFLOPS/cm$^2$.

TABLE 2

Device Areas

| Device | Device Area (μm$^2$) | Number of Devices |
|---|---|---|
| Adjustable NEMS Slot | ~300 | 10$^{12}$ |
| Liquid Crystal Modulator | ~10 | 10$^{12}$ |
| Memristor | ~1 | 10$^{12}$ |
| Plasmonic Modulator | ~200 | 10$^{12}$ |
| Ring Resonators | ~100 | 10$^9$ |
| Input SLM Pixel | ~10-100* | 10$^6$ |
| Photodetector | ~1 | 10$^{12}$ |
| Analog-to-Digital Converter (ADC) | ~23,000 | 10$^6$ |
| Digital-to-Analog Converter (DAC) | ~11,000 | 10$^6$ |

*Photonic crystal or vertically coupled disk

Experimental Demonstration

FIG. 14 illustrates an experimental implementation of the photonic tensor processor in FIG. 2A. The processor 1400 includes a 532 nm continuous-wave (CW) laser diode 1402 and a first liquid crystal on silicon (LCoS) SLM 1410a as a stand-in for a high-speed source array. The first SLM encodes the input activations, a second LCoS SLM 1410b performs the fan-out, and a third LCoS SLM 1410c performs the weighting. An isolator (Isol.) prevents reflected light from propagating back into the laser diode 1402. Half-wave plates λ/2 rotate the polarization state of the beam, and polarizers (Pol.) reject light in unwanted polarization states. Polarizing beam splitters (PBSs), a non-polarizing beam splitter (BS), mirrors, and lenses direct the beam. The processor 1400 includes achromatic doublets $f_1$ of focal length 250 mm and a pair of achromatic doublets $f_2$ with focal lengths 180 mm and 750 mm. The lens focal lengths were selected for 1:1 pixel matching from the first SLM 1410a to the third SLM 1410c to a camera 1420 (detector array). Z translation stages (not shown) allow fine-tuning of the magnification. The camera 1420 is connected to a computer (not shown) for the summation and nonlinearity.

In operation, the laser diode 1402 illuminates the first LCoS SLM 1410a with a flat wavefront, which encodes the beam with input activation intensities. In the Fourier plane of the first SLM 1410a, the second LCoS SLM 1410b displays a spot array generation phase pattern, calculated using the weighted Gerchberg-Saxton algorithm, which creates replicas of the activation pattern in the image plane, just like in FIG. 2C. The third LCoS SLM 1410c applies the weights in the image plane of the first SLM 1410a. A telescope transmits the signal to the camera 1420, which transduces it to electronic form for the summation and nonlinearity (e.g., ReLU) by the computer. The output from a layer of the DNN as produced by the computer is fed back to the first SLM 1410a as the input to the next layer of the DNN.

We used the processor 1400 in FIG. 14 to perform inference on the MNIST handwritten digit dataset. The processor 1400 computed a relatively small optical analog matrix-vector product (without multi-stage readout) to demonstrate low loss of classification accuracy on the MNIST handwritten digit dataset. More specifically, we encoded 784 input activations and used a two-hidden-layer DNN with 25 activations per hidden layer (trained on a digital electronic computer). Our results show a classification accuracy of 94% on the 10,000 previously unseen MNIST test images, compared with the ground truth (all-electronic) accuracy (96%). These results demonstrate small loss of classification accuracy with analog optical data encoding, fan-out, and weighting without retraining on the hardware.

We also investigated the fundamental limit to throughput of our system by testing for accuracy degradation with short pulse lengths. The distance in the image plane between each replicated input activation pattern and the optical axis is linear in wavelength, which means that a spectrally broad source yields blurred outputs. For this experiment, the third SLM 1410c in the photonic tensor processor 1400 of FIG. 14 was replaced with a mirror and the weighting was performed electronically on the computer. We also replaced the CW diode 1402 with a supercontinuum source and varied its output bandwidth as plotted in FIG. 15A.

The modified photonic tensor processor classified 1,000 MNIST images with the 2-hidden-layer DNN described above. As shown in FIG. 15B, the classification error doubles from 4% with the CW diode (narrowest spectral width) to 8% at an RMS spectral width of 4 nm; we define this value as the widest acceptable source bandwidth. Given a transform-limited source in an optimized implementation, this bandwidth yields a FWHM pulse width of about 0.1 ps. The maximum throughput in the first layer is thus the number of multiply-accumulate operations (#MACs=28× 28×25) divided by the pulse length, which yields about 200 petaMACs/s. Therefore, even for smaller networks without multi-stage accumulation, with emerging very fast modulators (e.g., plasmonic electrooptic modulators), our photonic tensor processor can approach exascale computing.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A receiver array for inference processing, the receiver array comprising:
   an array of receiver blocks, each receiver block in the array of receiver blocks comprising:
      an array of photodetectors, each photodetector in the array of photodetectors configured to emit a photocurrent in response to detecting light representing a corresponding element of an input vector;
      an array of static weighting devices, each static weighting device in the array of static weighting devices operably coupled to a corresponding photodetector in the array of photodetectors and configured attenuate the photocurrent emitted by the corresponding photodetector by an amount proportional to a corresponding element of a weight matrix;
      an array of wires, each wire in the array of wires operably coupled to a corresponding subset of photodetectors in the array of photodetectors and configured to sum the photocurrents generated by the corresponding subset of photodetectors;
      an array of modulators, each modulator in the array of modulators operably coupled to a corresponding wire in the array of wires and configured to modulate an amplitude of a corresponding wavelength-division multiplexed (WDM) beam of light in proportion to the sum of the photocurrents from the corresponding wire;

an optical bus in optical communication with the array of modulators and configured to guide the WDM beams of light from the array of modulators; and a broadband photodetector in optical communication with the optical bus and configured to incoherently sum the WDM beams of light.

2. The receiver array of claim 1, wherein the array of receiver blocks comprises about 1,000 to about 1,000,000 receiver blocks.

3. The receiver array of claim 2, wherein each array of photodetectors comprises about 1,000 to about 1,000,000 photodetectors.

4. The receiver array of claim 1, wherein the static weighting devices in the array of static weighting devices are configured to attenuate the photocurrents without consuming electrical power.

5. The receiver array of claim 1, wherein the array of static weighting devices comprises nanoelectromechanical systems (NEMS) slot waveguides configured to attenuate the light representing the elements of the input vector.

6. The receiver array of claim 1, wherein the array of static weighting devices comprises a liquid crystal modulator configured to attenuate the light representing the elements of the input vector.

7. The receiver array of claim 1, wherein the array of static weighting devices comprises memristive current dividers to attenuate the photocurrents.

8. The receiver array of claim 1, wherein the array of static weighting devices comprises plasmonic slots to attenuate the photocurrents.

9. The receiver array of claim 1, wherein the array of static weighting devices comprises an optical phase change material.

10. A photonic tensor processor comprising:
the receiver array of claim 1;
an input source configured to generate the light with an amplitude modulation representing the input vector; and
free-space optics in optical communication with the receiver array and the input source and configured to fan out the light with the amplitude modulation representing the input vector to each receiver block in the receiver array.

11. The photonic tensor processor of claim 10, wherein the input source comprises at least one of a spatial light modulator, an array of light sources, or an array of plasmonic modulators.

12. The photonic tensor processor of claim 10, wherein the free-space optics comprise a phase mask configured to fan out the light with the amplitude modulation representing the input vector to a two-dimensional spot array.

13. A method of inference processing, the method comprising:
at each photodetector in an array of photodetectors:
converting light representing a corresponding element of an input vector into a photocurrent; and
attenuating the photocurrent by an amount proportional to a corresponding element of a weight matrix;
summing the photocurrents from the array of photodetectors;
modulating an amplitude of a wavelength-division multiplexed (WDM) beam of light in proportion to the sum of the photocurrents; and
detecting the WDM beam of light.

14. The method of claim 13, wherein the WDM beam of light is a first WDM beam of light and detecting the first WDM beam of light comprises incoherently summing the first WDM beam of light with a second WDM beam of light.

15. The method of claim 13, wherein attenuating the photocurrent comprises:
passing the light through a slot before the photodetector, the slot having a width selected to attenuate the light by the amount proportional to the corresponding element of the weight matrix; and
detecting the light transmitted through the slot with the photodetector.

16. The method of claim 13, wherein attenuating the photocurrent comprises:
varying a polarization of the light before the photodetector; and
passing the light through a polarizer before the photodetector.

17. The method of claim 13, wherein attenuating the photocurrent comprises dividing the photocurrent with a memristive current divider coupled to the photodetector.

18. The method of claim 13, further comprising:
fanning out the light representing the elements of the input vector to the photodetectors in the array of photodetectors.

19. The method of claim 18, wherein fanning out the light comprises fanning out the light to a two-dimensional spot array.

20. The method of claim 13, further comprising:
generating a subsequent input vector based on the WDM beam of light.

* * * * *